US012788654B2

(12) United States Patent
Lafleche et al.

(10) Patent No.: US 12,788,654 B2
(45) Date of Patent: Nov. 10, 2026

(54) PATIENT SUPPORT HAVING BUCKLING ELEMENTS FOR SUPPORTING A PATIENT

(71) Applicant: Stryker Corporation, Kalamazoo, MI (US)

(72) Inventors: Patrick Lafleche, Kalamazoo, MI (US); Justin Jon Raymond, Jackson, MI (US); James K. Galer, Byron Center, MI (US); Ross Jones, Cambridge (GB)

(73) Assignee: Stryker Corporation, Portage, MI (US)

( * ) Notice: Subject to any disclaimer, the term of this patent is extended or adjusted under 35 U.S.C. 154(b) by 476 days.

(21) Appl. No.: 17/953,653

(22) Filed: Sep. 27, 2022

(65) Prior Publication Data

US 2023/0033197 A1 Feb. 2, 2023

Related U.S. Application Data

(62) Division of application No. 16/585,282, filed on Sep. 27, 2019, now Pat. No. 11,491,064.

(60) Provisional application No. 62/738,375, filed on Sep. 28, 2018.

(51) Int. Cl.
*A61G 7/05* (2006.01)
*A61G 7/00* (2006.01)
*A61G 7/057* (2006.01)

(52) U.S. Cl.
CPC ......... *A61G 7/05715* (2013.01); *A61G 7/001* (2013.01); *A61G 2200/32* (2013.01)

(58) Field of Classification Search
CPC ................ A61G 7/05715; A61G 7/001; A61G 2200/32; F16F 3/00; F16F 1/00; F16F 3/087; F16F 1/36; F16F 3/08; F16F 1/37; F16F 1/54; B60R 21/04
USPC .................................................. 267/144, 142
See application file for complete search history.

(56) References Cited

U.S. PATENT DOCUMENTS

| | | | | |
|---|---|---|---|---|
| 4,665,573 | A | 5/1987 | Fiore | |
| 5,007,124 | A | 4/1991 | Raburn et al. | |
| 5,179,742 | A | 1/1993 | Oberle | |
| 5,201,780 | A | 4/1993 | Dinsmoor et al. | |
| 5,596,781 | A * | 1/1997 | Graebe | A61G 5/1091 5/710 |
| 5,749,111 | A | 5/1998 | Pearce | |
| 6,026,527 | A | 2/2000 | Pearce | |
| 6,115,861 | A | 9/2000 | Reeder et al. | |
| 6,687,936 | B2 * | 2/2004 | Graebe | A47C 27/081 137/625.48 |

(Continued)

FOREIGN PATENT DOCUMENTS

| | | | |
|---|---|---|---|
| GB | 2405582 | A | 3/2005 |
| KR | 2013076922 | A | 7/2013 |
| WO | 95007679 | A2 | 3/1995 |

OTHER PUBLICATIONS

English language abstract and machine-assisted English translation for KR 20130076922 extracted from espacenet.com database on Aug. 20, 2018, 8 pages.

*Primary Examiner* — Bradley T King
*Assistant Examiner* — James K Hsiao
(74) *Attorney, Agent, or Firm* — Howard & Howard Attorneys PLLC

(57) ABSTRACT

This disclosure provides a patient support for supporting a patient. The patient support comprises a lattice of cells each having a base, a top disposed opposite the base, and one or more buckling elements having a thickness and extending from the base to the top to form a column.

14 Claims, 21 Drawing Sheets

(56) References Cited

U.S. PATENT DOCUMENTS

| | | | | |
|---|---|---|---|---|
| 6,687,937 | B2 * | 2/2004 | Harker | A61G 7/05784 5/699 |
| 7,823,234 | B2 | 11/2010 | Flick et al. | |
| 7,883,478 | B2 * | 2/2011 | Skinner | A61G 7/05769 600/595 |
| 7,886,386 | B2 | 2/2011 | Balonick et al. | |
| 7,937,791 | B2 * | 5/2011 | Meyer | A61G 7/05715 5/736 |
| 8,069,514 | B2 | 12/2011 | Poulos et al. | |
| 8,334,779 | B2 | 12/2012 | Zerhusen et al. | |
| 8,434,748 | B1 * | 5/2013 | Pearce | A47C 27/20 5/655.5 |
| 8,490,233 | B2 | 7/2013 | Essers | |
| 8,549,684 | B2 | 10/2013 | Jusiak | |
| 8,628,067 | B2 | 1/2014 | Pearce et al. | |
| 8,904,584 | B2 * | 12/2014 | Sugano | B29D 22/00 5/652 |
| 8,910,334 | B2 | 12/2014 | Lafleche et al. | |
| 8,919,750 | B2 | 12/2014 | Pearce et al. | |
| 9,021,638 | B2 | 5/2015 | Misaki | |
| 9,320,311 | B2 * | 4/2016 | Szalkowski | A42B 3/12 |
| 9,420,895 | B2 | 8/2016 | Lafleche et al. | |
| 9,468,307 | B2 | 10/2016 | Lafleche et al. | |
| 9,782,312 | B2 * | 10/2017 | Brubaker | A61G 7/05792 |
| 11,191,367 | B2 * | 12/2021 | Arzanpour | A47C 31/126 |
| 11,324,652 | B2 * | 5/2022 | Hollabaugh | A61G 7/1074 |
| 2004/0226099 | A1 | 11/2004 | Pearce | |
| 2006/0112489 | A1 * | 6/2006 | Bobey | A61G 7/05715 5/713 |
| 2007/0277320 | A1 * | 12/2007 | Massmann | A47C 4/54 5/710 |
| 2008/0095983 | A1 * | 4/2008 | Callsen | A47C 27/20 428/141 |
| 2010/0212087 | A1 | 8/2010 | Leib et al. | |
| 2012/0244312 | A1 | 9/2012 | Pearce et al. | |
| 2013/0000045 | A1 * | 1/2013 | Losio | A47C 27/085 5/655.5 |
| 2013/0061396 | A1 * | 3/2013 | Lafleche | A61H 23/04 5/706 |
| 2013/0167302 | A1 | 7/2013 | Pearce | |
| 2013/0205509 | A1 | 8/2013 | Chen | |
| 2015/0059100 | A1 * | 3/2015 | Brubaker | A61G 7/05738 5/713 |
| 2017/0261824 | A1 | 9/2017 | Chen et al. | |
| 2017/0356517 | A1 | 12/2017 | Betteridge et al. | |
| 2020/0100965 | A1 | 4/2020 | Lafleche et al. | |
| 2021/0059881 | A1 * | 3/2021 | Raymond | A47C 27/15 |

* cited by examiner

FIG. 19
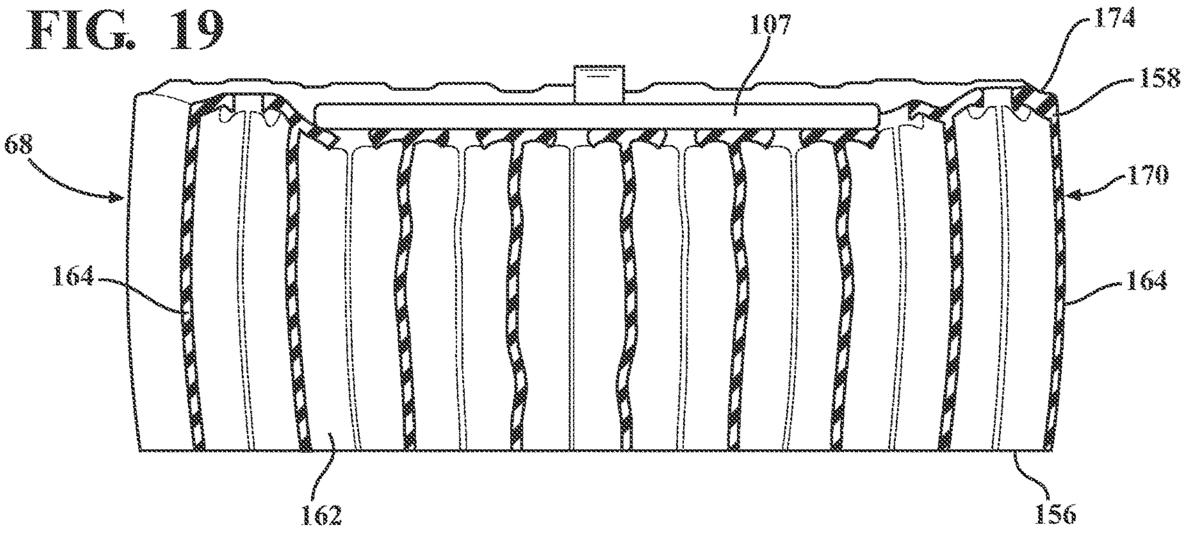
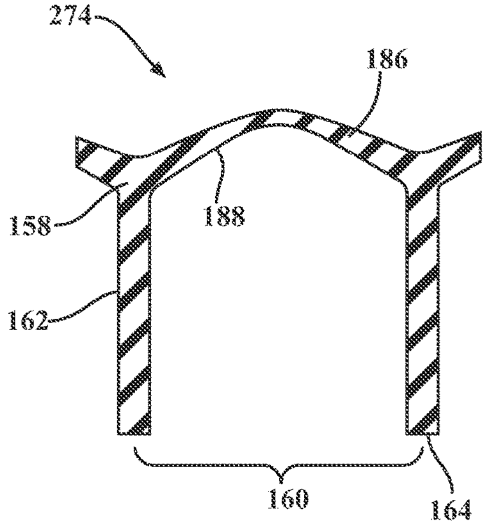
FIG. 20A
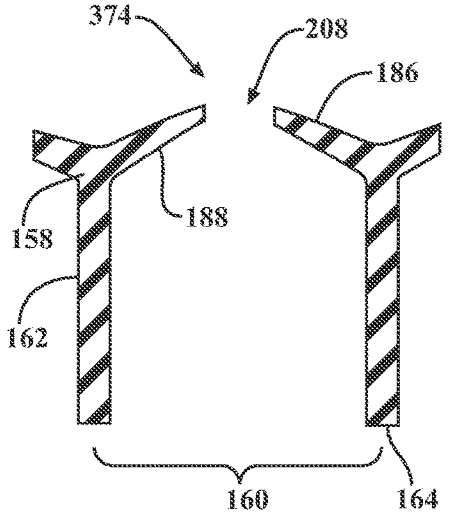
FIG. 20B
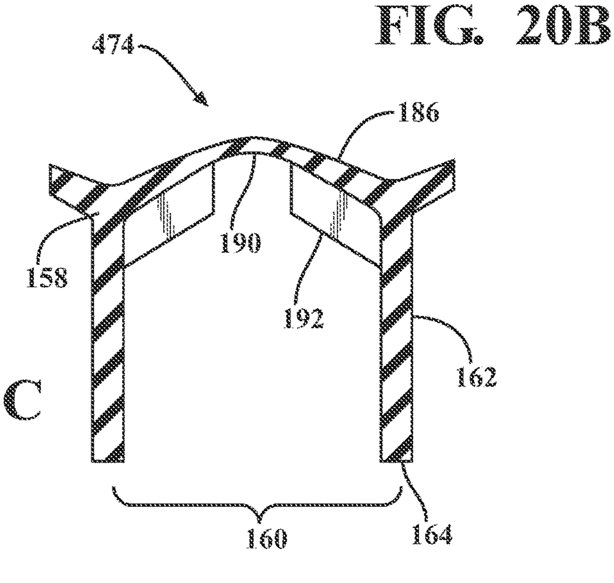
FIG. 20C

PATIENT SUPPORT HAVING BUCKLING ELEMENTS FOR SUPPORTING A PATIENT

CROSS-REFERENCE TO RELATED APPLICATIONS

The subject patent application is a Divisional of U.S. patent application Ser. No. 16/585,282, filed on Sep. 27, 2019, which claims priority to and all the benefits of U.S. Provisional Patent Application No. 62/738,375, filed on Sep. 28, 2018, the disclosures of each of which are hereby incorporated by reference in their entirety.

BACKGROUND

Prolonged bed rest without adequate mobilization is often associated with increased risk of pressure sores/ulcers for patients. Many patient supports (e.g., mattresses) are designed to minimize pressure on a patient's body yet remain inadequate. Ideally, a patient support should have an indentation force deflection (IFD) curve with a nearly uniform pressure plateau over a wide range of displacements that result from patients of varying body weights using the patient support. Instead, many patient supports tend to have an extended elastic response (for lighter weight patients) or densification and bottoming out of the patient support (for heavier weight patients). Both scenarios are undesirable. See the notations in FIG. 10, for example. Moreover, many patient supports suffer from what is known in the art as "hammocking" and do not spread out tissue interface pressures (TIPs) sufficiently to avoid pressure sores/ulcers.

Some patient supports include a topper disposed on top of a core to ameliorate some of the undesirable conditions mentioned above. Such designs, however, typically lack a clear pressure plateau that is measureable. Many toppers produce a "hump-dip" shaped IFD curve (again, see FIG. 10) based on one of several types of undesirable buckling behaviors of the core.

A patient support designed to address one or more of the aforementioned deficiencies is desired.

BRIEF DESCRIPTION OF THE DRAWINGS

Advantages of the present disclosure will be readily appreciated as the same becomes better understood by reference to the following detailed description when considered in connection with the accompanying drawings.

FIG. 19 is a side cross-sectional view of a lattice of cells each having a base, a top disposed opposite the base, buckling elements extending from the base to the top to form a column, and a cap with an opening disposed on the six buckling elements to disperse compression pressure exerted on the top with an indenter resulting in flattened caps, initial buckling, representing uniform pressure exerted on a patient.

FIG. 20A is a side cross-sectional view of a cap (dome) that is described as a solid dome.

FIG. 20B is a side cross-sectional view of a cap (dome) that is described as a dome that defines an opening therein.

FIG. 20C is a side cross-sectional view of a cap (dome) that is described as a buttressed dome.

DETAILED DESCRIPTION

Figure 1:
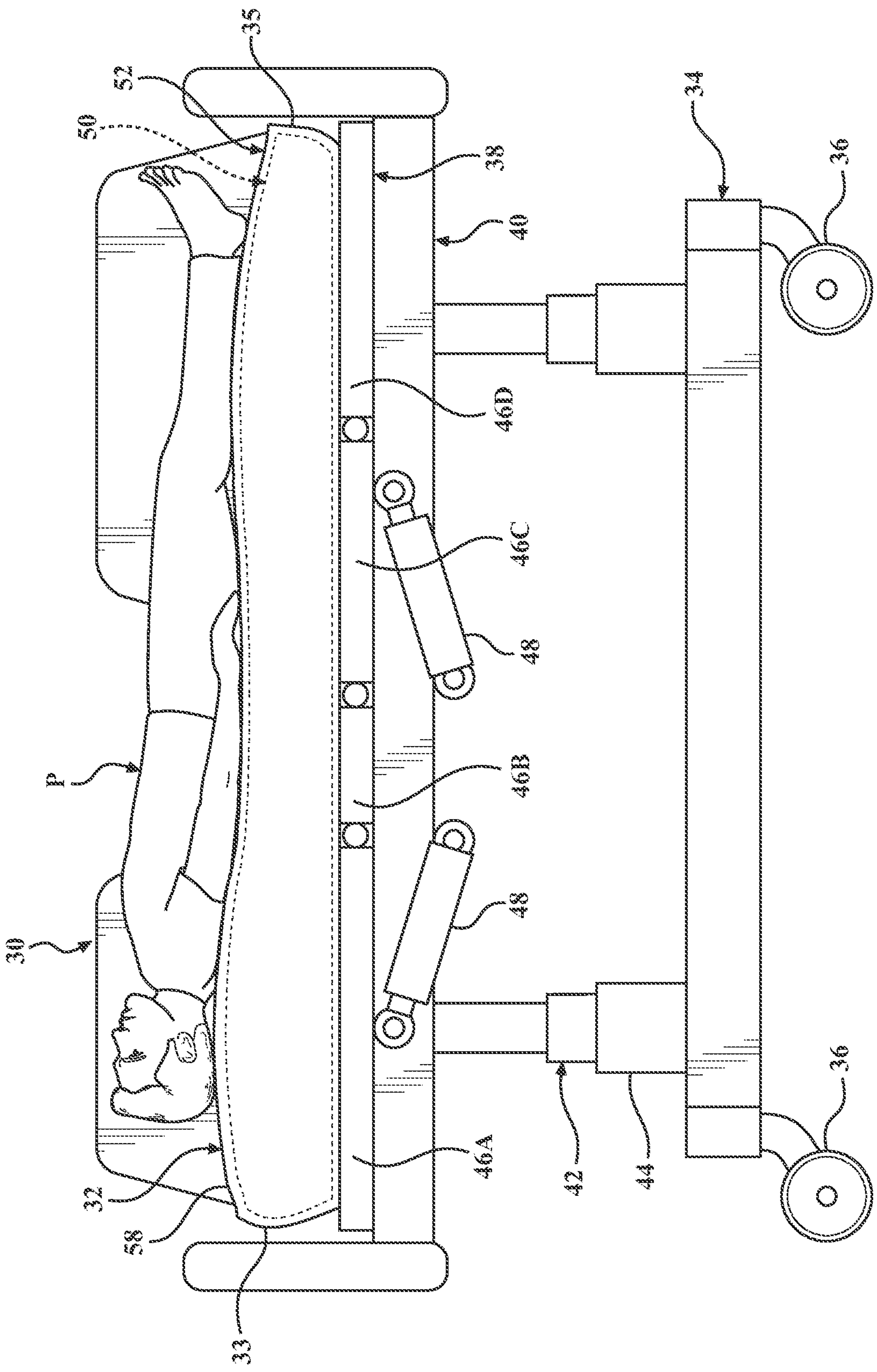
FIG. 1 is an elevational view of a patient support apparatus including a patient support.

FIG. 1 illustrates a patient support apparatus 30 including a patient support 32 in accordance with an exemplary embodiment of the present disclosure. The patient support apparatus 30 shown in FIG. 1 is a hospital bed, but alternatively may be a stretcher, cot, trolley, gurney, wheelchair, recliner, chair, table, or other suitable support or transport apparatus. The patient support apparatus 30 may include a base 34 having wheels 36 adapted to rest upon a floor surface, and a patient support deck 38 supported by the base 34. The illustrated embodiment shows the wheels 36 as casters configured to rotate and swivel relative to the base 34 during transport with each of the wheels 36 disposed at or near an end of the base 34. In some embodiments, the wheels 36 may be non-steerable, steerable, non-powered, powered, or combinations thereof. For example, the patient support apparatus 30 may comprise four non-powered, non-steerable wheels, along with one or more additional powered wheels. The present disclosure also contemplates that the patient support apparatus 30 may not include wheels.

The patient support apparatus 30 may include an intermediate frame 40 spaced above the base 34 with the patient support deck 38 coupled to or disposed on the intermediate frame 40. A lift device 42 may be operably coupled to the intermediate frame 40 and the base 34 for moving the patient support deck 38 relative to the base 34. In the exemplary embodiment illustrated in FIG. 1, the lift device 42 includes a pair of linear actuators 44, but other suitable constructions are contemplated. The illustrated embodiment also shows the patient support deck 38 including articulating sections 46 configured to articulate the patient support 32 between various configurations. The articulating sections 46 may include a fowler section 46A, a seat section 46B, a thigh section 46C, a leg section 46D, and the like, operably coupled to actuators 48. For example, the actuators 48 may move the fowler section 46A between a first position in which the patient P is supine, as illustrated in FIG. 1, and a second position in which the torso of the patient P is positioned at an incline. For another example, a gatch maneuver may be performed in which the positions of the thigh and/or leg sections 46C, 46D are articulated to impart flexion or extension to lower extremities of the patient.

The patient support 32 is supported on the patient support deck 38 of the patient support apparatus 30. The illustrated embodiment shows the patient support 32 as a mattress for supporting the patient P when positioned on the patient support apparatus 30. The patient support 32 includes a crib assembly 50 to be described in detail, and in certain embodiments a cover assembly 52 within which the crib assembly 50 is disposed.

Figure 2:
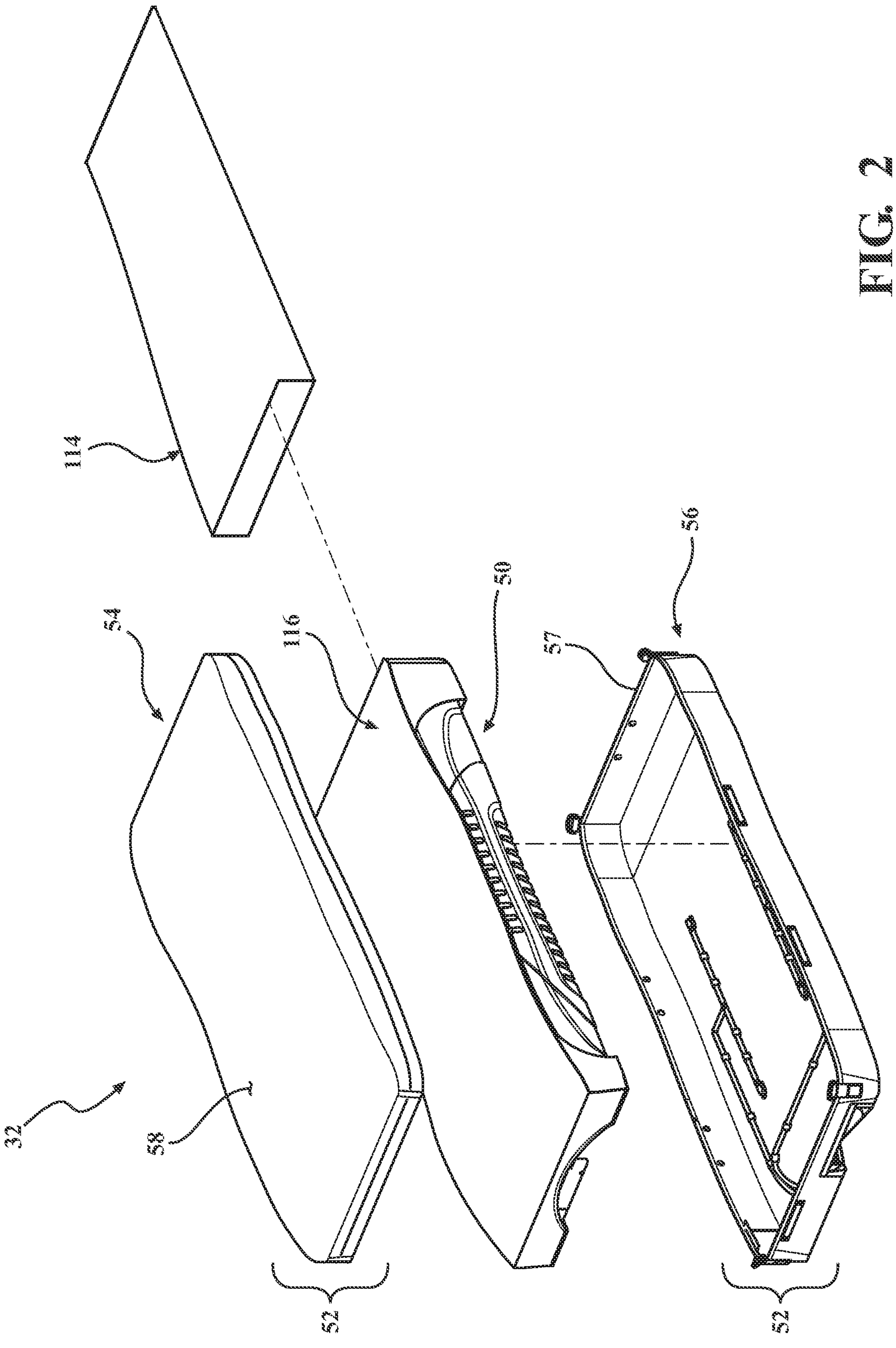
FIG. 2 is an exploded view illustrating a crib assembly, spacer layer, and a cover assembly.
Figure 3:
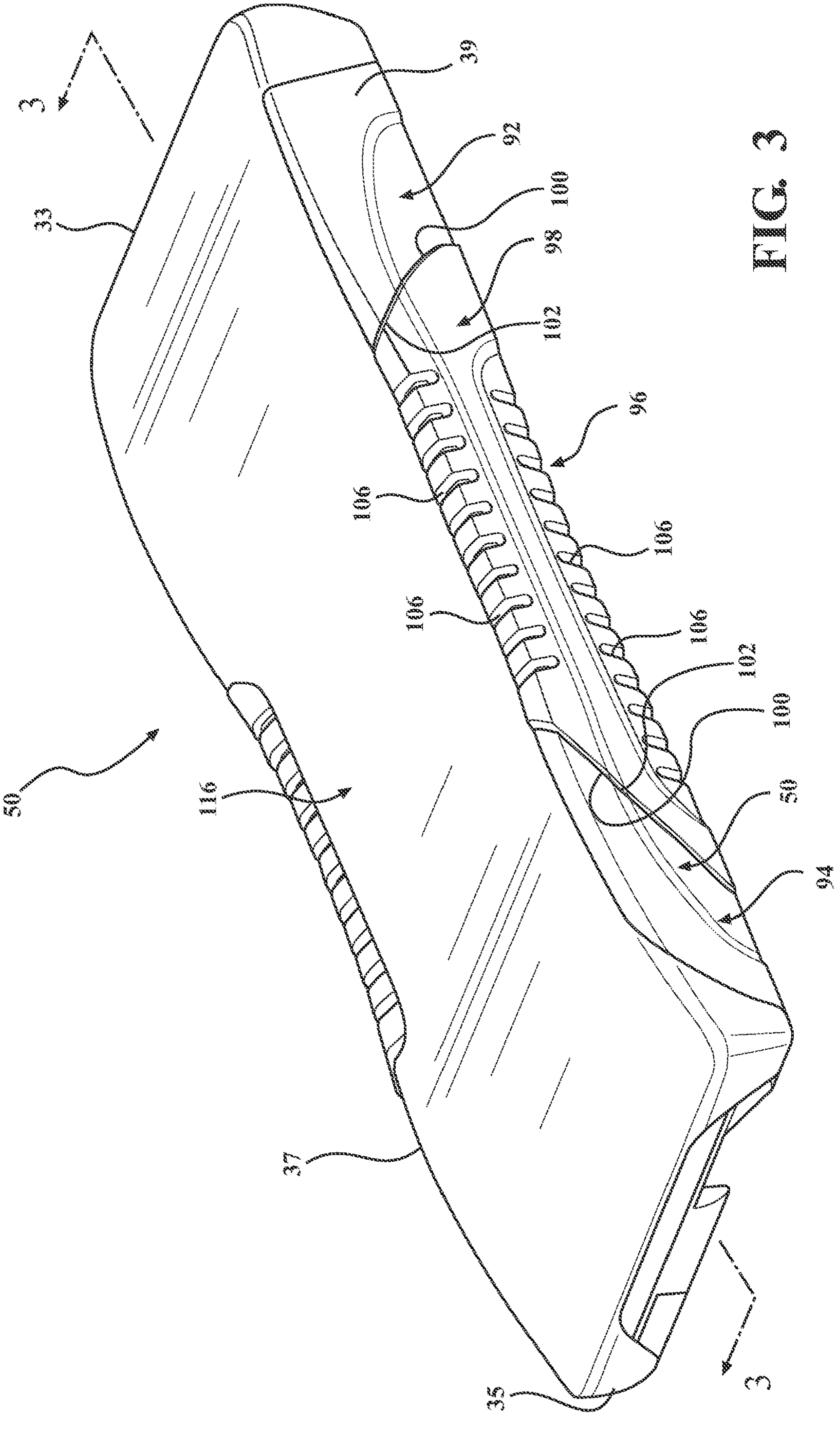
FIG. 3 is a perspective view of the crib assembly and the spacer layer.

Referring to FIG. 2, the cover assembly 52 may include a top cover 54 opposite a bottom cover assembly 56 that cooperate to define an interior sized to receive the crib assembly 50. In certain embodiments, the cover assembly 52 may include a fastening device 57 (see also FIG. 6) for coupling the top cover 54 and the bottom cover assembly 56. In one example, the fastening device 57 is a zipper extending about sides of the cover assembly 52. Other fastening devices may include snaps, clips, tethers, hook and eye connections, adhesive, and the like. In one variant, the top cover 54 and the bottom cover assembly 56 are integrally formed to provide the cover assembly 52 of unitary structure that is not removable from the crib assembly 50. A watershed (not shown) may be coupled to the top cover 54 and/or the bottom cover assembly 56 near the fastening device 57 to prevent ingress of fluid and other substances through the fastening device 57 to within the patient support 32. The crib assembly 50 disposed within the cover assembly 52 may be substantially encased within the cover assembly 52 to define the patient support 32. The crib assembly 50 includes a head end 33 opposite a foot end 35 separated by opposing sides 37, 39 (see FIG. 3).

The patient support 32 defines a patient support surface 58 (FIG. 2) for supporting the patient P. Absent bedding and the like, the patient P may be considered in direct contact with the patient support surface 58 when situated on the patient support 32. Referring now to FIGS. 1 and 2, the patient support surface 58 may be considered an upper surface of the top cover 54 of the cover assembly 52. In a variant without the cover assembly 52, the patient support surface 58 may be considered an upper surface of the crib assembly 50. The patient support surface 58 is sized to support at least a majority of the patient P. Furthermore, during movement therapy to be described, the patient support surface 58 is moved relative to other structures of the patient support 32 and the patient support apparatus 30.

Certain aspects of the crib assembly 50 will now be described with reference to FIGS. 4 and 5. The crib assembly 50, in a most general sense, provides the internal structure of the patient support 32 for supporting and cushioning the patient P on the patient support surface 58. The crib assembly 50 includes at least one, and in the illustrated embodiment more than one, conformable layers to resiliently deform when supporting the weight of the patient P. FIG. 5 shows the crib assembly 50 including an upper conformable layer 60 and a lower conformable layer 62. The upper conformable layer 60 may include a first section 64, a second section 65, and a third section 66 positioned along a length of the crib assembly 50 from the head end 33 to the foot end 35. The first, second, and third sections 64-66 may be arranged (e.g., positioned adjacent to one another) such that the upper conformable layer 60 is disposed beneath at least a majority of the patient support surface 58. In other words, the first section 64 may be disposed near the head end 33 and configured to support at least a portion of the upper body of the patient P, the third section 66 may be disposed near the foot end 34 and positioned to support at least a portion of the lower body of the patient P, and the second section 65 may be disposed between the first and third sections 64, 66 and positioned to support at least a portion of the upper and/or lower body of the patient P. More specifically, the second section 65 may be positioned to support the sacrum, buttocks, and thighs of the patient P, and includes features to be described that accommodate the increased focal pressures often experienced by the patient P in these anatomical areas.

In certain embodiments, the first, second, and/or third sections 64-66 of the upper conformable layer 60 may each include a lattice 68 of cells 70 to be described in greater detail. The lattices 68 of cells 70 may be integrally formed or separately formed lattices 68 that are connected together. Each lattice 68 of cells 70 may be formed of elastic materials, visco-elastic materials, and/or other suitable materials. FIG. 5 shows the first, second, and third sections 64-66 including a head lattice, a torso lattice, and a foot lattice, respectively, with the lattices 68 of an adjacent two of the first, second, and third sections 64-66 positioned in an interlocking arrangement (e.g., a hexagonal tessellation to be described). In other words, the cells 70 at one end of the head lattice 68 are staggered to provide a zig-zag end, and the cells 70 at a complementary end of the torso lattice 68 are staggered to provide a complementary zig-zag end. Likewise, the cells 70 at the other end of the torso lattice 68 are staggered to provide a zig-zag end, and the cells 70 at a complementary end of the foot lattice 68 are staggered to provide a complementary zig-zag end. The complementary zig-zags are positioned in abutting relationship to provide the interlocking arrangement such that, when assembled, the lattices 68 of the first, second, and third sections 64-66 appear integrally formed or continuous.

Figure 4:
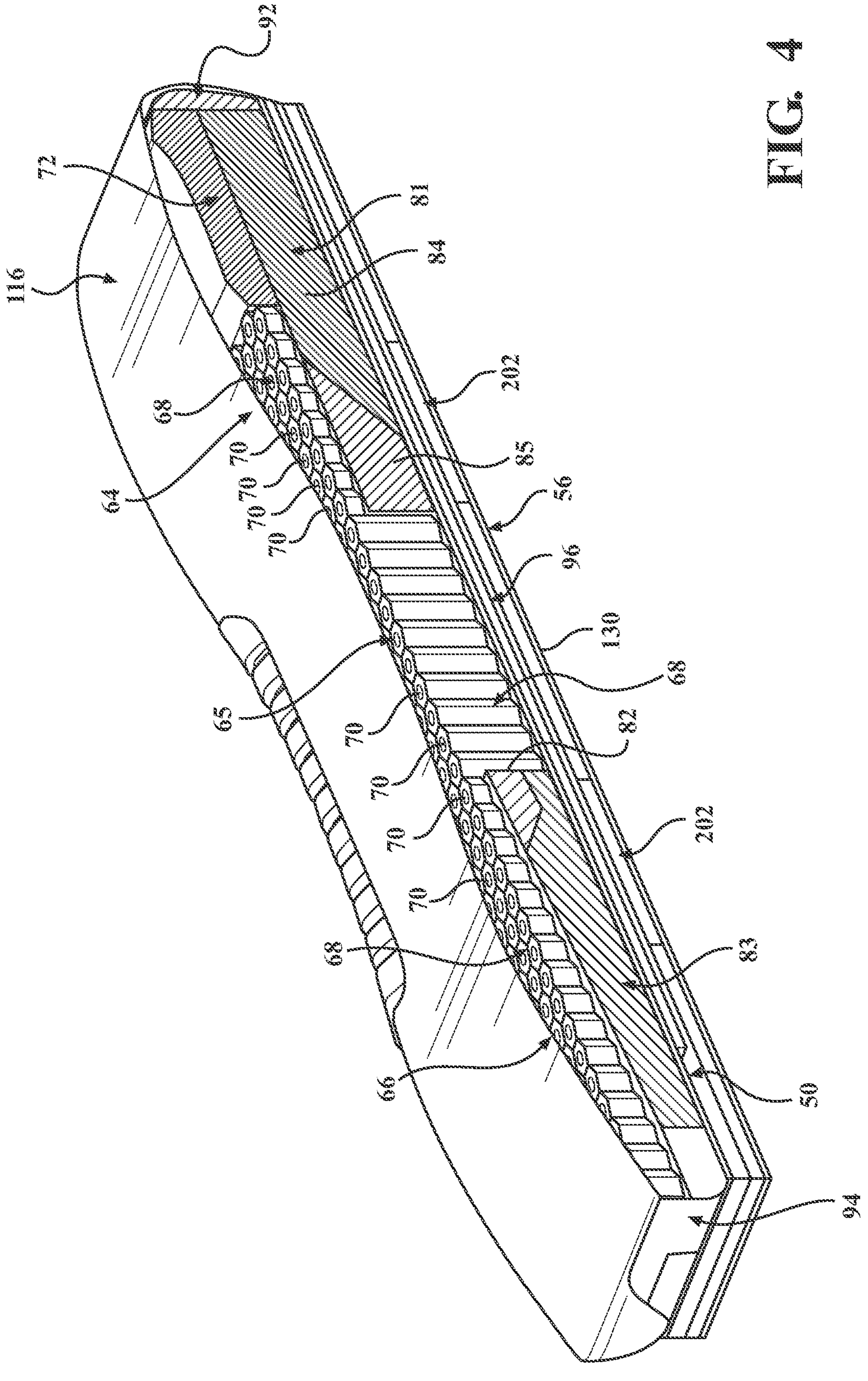
FIG. 4 is a cross-sectional view of the crib assembly and the spacer layer.
Figure 5:
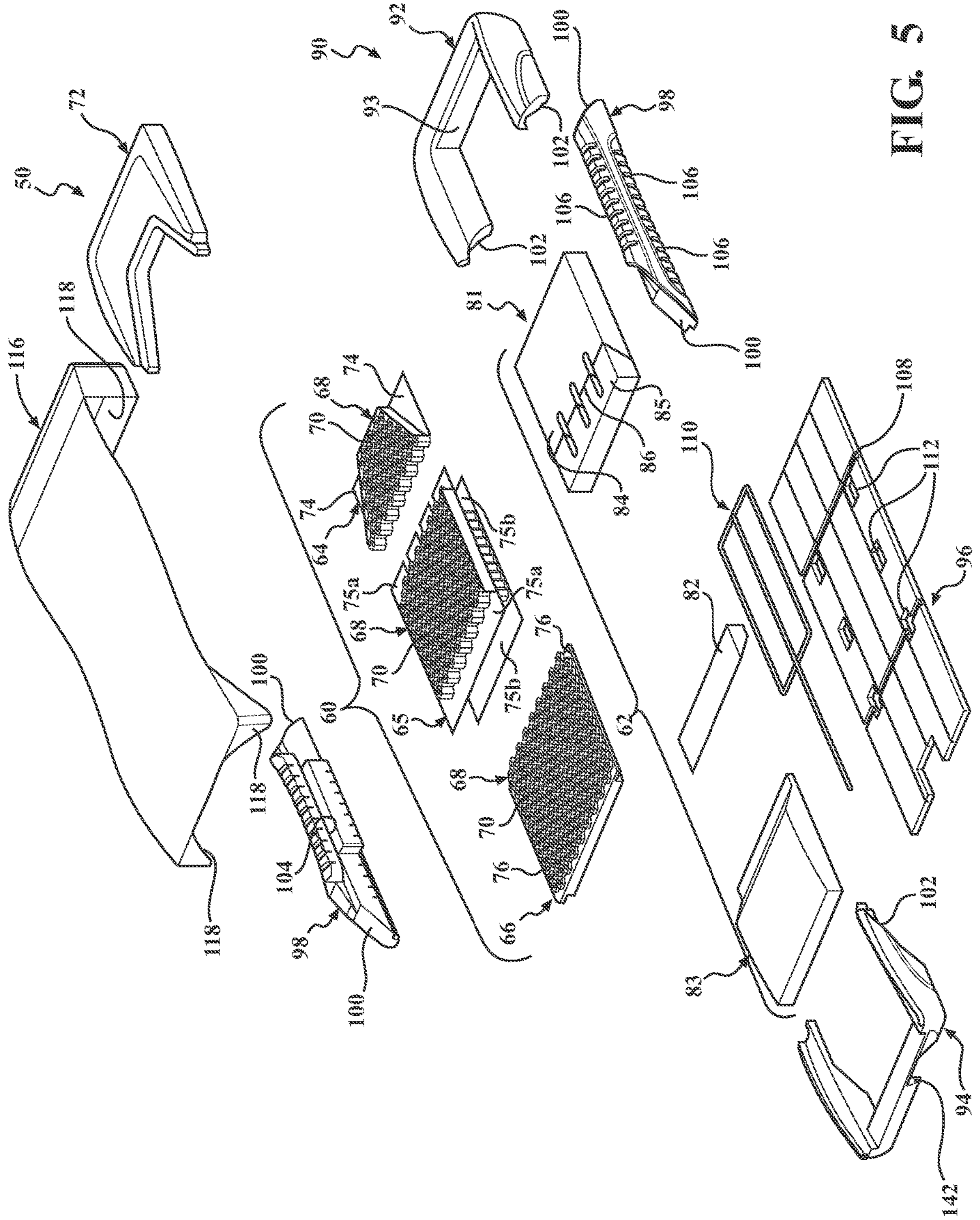
FIG. 5 is an exploded view of the crib assembly and the spacer layer.

With continued reference to FIGS. 4 and 5, the lattice 68 of the first section 64 may include a taper such that the lattice 68 appears generally trapezoidal in shape when viewed in plan. The taper is shaped to accommodate a head end support 72 of the crib assembly 50. In particular, the head end support 72 may be generally U-shaped in construction with opposing legs of the head end support 72 being shaped complementarily to the taper of the lattice 68 of the first section 64. The first section 64 may include coupling features 74 (described further below) extending outwardly from the legs of the trapezoidal-shaped lattice 68 such that the first section 64 appears rectangular when viewed in plan. The coupling features 74 are configured to be coupled with an underside of the legs of the head end support 72 by a suitable joining means, for example an adhesive. A thickness of an end of the head end support 72 adjacent the first section 64 may be approximate a thickness of the lattice 68 of the first section 64 such that, when the head end support 72 and the first section 64 are coupled together, a contoured surface is provided. It is understood from FIGS. 4 and 5 that the head end support 72 may be further contoured in a manner to support the head of the patient P. In certain embodiments, the head end support 72 may be formed from material(s) with less conformability relative to that of the lattice 68 of the first section 64 to accommodate the distinct considerations of supporting the head of the patient P on the patient support 32.

The second section 65 of the upper conformable layer 60 may include the lattice 68 that is generally rectangular in shape when viewed in plan. The second section 65 may include coupling features 75*a*, 75*b* extending outwardly from the rectangular-shaped lattice 68. The coupling features include upper coupling features 75*a*, and lower coupling features 75*b* to be described. The upper coupling features 75*a* on one end of the second section 65 are configured to be coupled with an underside of the first section 64 by a suitable joining means, for example an adhesive, when the head lattice and the torso lattice are positioned in the interlocking arrangement previously described. Likewise, upper coupling features 75*a* on the other end of the second section 65 are configured to be coupled with an underside of the third section 66 with a suitable joining means, for example an adhesive, when the torso lattice and the foot lattice are positioned in the interlocking arrangement previously described. As best shown in FIG. 4, a thickness of the lattice 68 of the second section 65 may be greater than each of the lattices 68 of the first and third sections 64, 66. The increased thickness of the torso lattice, among other advantages, accommodates the increased focal pressures often experienced by the patient P in the anatomical areas mentioned.

The lower conformable layer 62 may include a first section 81, a second section 82, and a third section 83. The first, second, and/or third sections 81-83 of the lower conformable layer 62 may be formed from foam-based material(s) and/or other suitable material(s). The material(s) comprising the first, second, and/or third sections 81-83 may be less conformable relative to that of the lattices 68 of the first, second, and/or third sections 64-66, as it is appreciated that cushioning demands of the lower conformable layer 62 may be relatively less than that of the upper conformable layer 60. The first section 81 may be at least partially positioned beneath at least one of the head end support 72 and the first section 64 of the upper conformable layer 60. In other words, an underside of the head end support 72 and/or the first section 64 is supported upon an upper surface of the first section 81. The first section 81 may include a first portion 84 and a second portion 85 coupled to one another at a joint 86.

As mentioned, the thickness of the lattice 68 of the second section 65 may be greater than the thickness of each of the lattices 68 of the first and third sections 64, 66. With continued reference to FIGS. 4 and 5, an end of the first section 81 of the lower conformable layer 62 may be positioned adjacent a corresponding end of the second section 65 of the upper conformable layer 60. In certain locations of the second section 65, there may not be a structure of the lower conformable layer 62 positioned beneath the second section 65 of the upper conformable layer 60. The second section 82 of the lower conformable layer 62 is positioned adjacent another end of the second section 65 of the upper conformable layer 60 opposite the first section 81, as best shown in FIG. 4. The second section 82 of the lower conformable layer 62 may further be at least partially positioned beneath the third section 66 of the upper conformable layer 60. In other words, an underside of the third section 66 is supported on an upper surface of the second section 82.

The third section 83 of the lower conformable layer 62 may be positioned adjacent the second section 82. The third section 83 may be at least partially positioned beneath at least one of the second and third sections 65, 66 of the upper conformable layer 62. In other words, an underside of the second section 65 and/or the third section 66 of the upper conformable layer 62 is supported upon an upper surface of the third section 83 of the lower conformable layer 62. With continued reference to FIGS. 4 and 5, each of the second and third sections 82, 83 of the lower conformable layer 62 may include complementarily inclined surfaces positioned in an abutting relationship.

As mentioned, the coupling features of the second section 65 may include the upper coupling features 75*a* previously described, and lower coupling features 75*b*. The lower coupling features 75*b* extend outwardly from the rectangular-shaped lattice 68 and are spaced apart from the upper coupling features 75*a* to define gaps therebetween. The lower coupling features 75*b* on one end of the second section 65 are configured to be coupled with an underside of the first section 81 by a suitable joining means, for example an adhesive, and the lower coupling features 75*b* on the other end of the second section 65 are configured to be coupled with an underside of the third section 83 by a suitable joining means, for example an adhesive. In such an arrangement, the gaps between the upper and lower coupling features 75*a*, 75*b* are sized to receive a thickness of the first section 81 and a combined thickness of the second and third sections 82, 83, as best shown in FIG. 4.

The upper conformable layer 60 and the lower conformable layer 62 are configured to be received in a cavity defined by a crib 90 of the crib assembly 50. In a most general sense, the crib 90 provides a framework of the patient support 32. In the illustrated embodiment, the crib 90 may include a head end frame member 92, a foot end frame member 94, a base layer 96, and side frame members 98 with each to be described in turn. The head end frame member 92 may be generally U-shaped in construction with the head end frame member 92 engaging the first section 81 of the lower conformable layer 62 on three sides. The head end frame member 92 may include a recess 93 sized to receive an end of the first section 81. Further, the generally U-shaped head end frame member 92 may at least partially engage the head end support 72 on three sides. In at least some respects, the head end frame member 92 may be considered the head end 33 of the crib assembly 50.

The foot end frame member 94 may be coupled to the upper and lower conformable layers 60, 62 opposite the head end frame member 92. The foot end frame member 94 may be coupled to an end of the third section 66 opposite the second section 65. FIG. 5 shows the foot end frame member 94 being generally U-shaped in construction so that the foot end frame member 94 engages the third section 66 on three sides. In particular, the third section 66 of the upper conformable layer 60 includes coupling features 76 extending from opposing sides of the lattice 68. The coupling features 76 are configured to be coupled with an upper surface of opposing legs of the generally U-shaped foot end frame member 94 by a suitable joining means, for example an adhesive. In at least some respects, the foot end frame member 94 may be considered the foot end 35 of the patient support 32.

Flanking the upper and lower conformable layers 60, 62 are the side frame members 98. The side frame members 98 are coupled to each of the head end frame member 92 and the foot end frame member 94. With concurrent reference to FIG. 3, the illustrated embodiment shows the side frame members 98 including inclined surfaces 100 matingly engaging complementary inclined surfaces 102 of each of the head end frame member 92 and the foot end frame member 94. Further, the side frame members 98 may be coupled to one or both of the upper and lower conformable layers 60, 62. FIG. 5 shows the side frame members 98 including an upper ledge 104 configured to receive the upper coupling features 75*a* extending from opposing sides of the second section 65 with a suitable joining means, for example an adhesive.

Referring to FIG. 5, the side frame members 98 may include slots 106 at least partially extending transversely through the side frame members 98 to define rib-like structures. The slots 106 may be provide for flexion of the side frame members 98 through relative articulation of the rib-like structures secondary to the material forming the side frame members 98. The slots 106 may further include upper and lower slots extending inwardly from upper and lower surfaces, respectively, of the side frame members 98.

The side frame members 98 coupled to each of the head end frame member 92 and the foot end frame member 94 may be considered to define a perimeter of the crib 90. The aforementioned cavity within which the upper and lower conformable layers 60, 62 are received is further defined by the base layer 96. Referring again to FIG. 5, the base layer 96 may be a planar structure to which each of the head end frame member 92, the foot end frame member 94, and the side frame members 98 are coupled. The base layer 96 is positioned beneath the lower conformable layer 62 such that an upper surface the base layer 96 may support the lower conformable layer 62. The base layer 96 may include at least one channel 108 sized to receive a first conduit assembly 110. The first conduit assembly 110 is configured to be in communication with a fluid source (not shown) to at least partially define a fluid flow path and circulate fluid from the fluid source, for example, air or conditioned fluid, through the fluid flow path to supply heat, remove heat, supply moisture, remove moisture, or the like, from the patient support surface 58. In other words, the first conduit assembly 110 circulating fluid may be utilized to control the conditions at or near an interface between the top cover 54 and the skin of the patient, to control the temperature and/or humidity at the interface. The base layer 96 may also define apertures 112 to accommodate structures of a patient turning system 200 to be described in greater detail. In certain embodiments, the crib assembly 50 includes a fire barrier layer 114 (see FIG. 2). Exemplary fire barrier layers suitable for the present application may be provided under the tradename NoMex (DuPont Company, Wilmington, Dela.), and under the tradename Integrity30 (Ventrex Inc., Ashburn, Virg.).

The patient support 32 may include a spacer layer 116 covering substantially an entirety of an upper surface of the crib assembly 50. More particularly, the spacer layer 116 covers the head end support 72 and the upper conformable layer 60. As best shown in FIG. 5, the spacer layer 116 may include coupling features 118 with the coupling features 118 at one end sized to receive the crib assembly 50, and more particularly the head end frame member 92. The coupling features 118 at the opposing end are configured to be coupled to the foot end frame member 94. The coupling features may be gusset-like features, such as elastic gussets conventionally provided on fitted sheets.

As previously mentioned, the top cover 54 is coupled to the bottom cover assembly 56, for example, with the fastening device 57. Components and features of the bottom cover assembly 56 will now be described with reference to FIG. 6. The bottom cover assembly 56 includes a carrier sheet 120. An upper surface of the carrier sheet 120 may be considered the structure in direct contact with an underside of the base layer 96 when the patient support 32 is assembled. At least one coupler 122 may be coupled to and extend from the upper surface of the carrier sheet 120. The couplers 122 are configured to secure a second conduit assembly 124 of the patient turning system 200 to be described. An underside of the base layer 96 may include additional channels (not shown) sized to receive the second conduit assembly 124 such that the underside of the base layer 96 and the upper surface of the carrier sheet 120 are in direct flat-on-flat contact. The carrier sheet 120 may include a base portion 126 and opposing sides 128 extending upwardly from the base portion 126. The fastening device 57 may be coupled to an upper edge of the opposing sides 128.

A bottom cover 130 may be coupled to the carrier sheet 120 to define a bottom of the patient support 32. In other words, an underside of the bottom cover 130 may be considered the surface in direct contact with the patient support deck 38 of the patient support apparatus 30 (see FIG. 1). The bottom cover 130 may include a head end section 132, a middle section 134, and a foot end section 136. The head end section 132, the middle section 134, and the foot end section 136 may be integrally formed or discrete components coupled to one another. The head end, middle, and foot end sections 132-136 collectively define a cavity sized to receive the carrier sheet 120, at least one patient turning device 202 of the patient turning system 200 to be described, and at least a portion of the crib assembly 50 previously described. In particular, an upstanding sidewall of each of the head end section 132 and the foot end section 136 may be arcuate and contoured to the head end frame member 92 and the foot end frame member 94, respectively, of the crib assembly 50. In the illustrated embodiment of FIG. 6, one or more handles 138 are coupled to head end, middle, and/or foot end sections 132-136 to assist caregivers with manipulating the patient support 32 when the patient support 32 is disposed on the patient support deck 38.

The foot end section 136 defines a recess 140 sized to receive a port connector 142 to be described in detail. In short, the port connector 142 includes ports (not shown) configured to be in fluid communication with the aforementioned fluid source, and further configured to be in fluid communication with the first conduit assembly 110 and the second conduit assembly 124. The recess 140 of the foot end section 136 may be substantially aligned with a void between the gusset-like coupling features 118 coupled to the foot end frame member 94. The recess 140 of the foot end section 136 may also be substantially aligned with a complementary recess 141 defined within the foot end frame member 92, as shown in FIG. 5. The port connector 142 is positioned within the recesses 140, 141 so as to be accessible by caregivers positioned near the foot end 35 of the patient support 32.

The middle section 134 of the bottom cover 130 includes a base portion 144 and opposing sides 146 extending upwardly from the base portion 144. The fastening device 57 may be coupled to an upper edge of the opposing sides 146 (with or without also being coupled to the upper edge of the opposing sides 128 of the carrier sheet 120). With the carrier sheet 120 received within the middle section 134 of the bottom cover 130, the base portion 126 of the carrier sheet 120 is adjacent the base portion 144 of the bottom cover 130 (other than the presence of the patient turning devices 202), and the opposing sides 128 of the carrier sheet 120 are adjacent the opposing sides 146 of the bottom cover 130. The base portion 144 and/or opposing sides 146 of the bottom cover 130 may define an augmenting feature 148. In short, because the patient turning devices 202 are positioned external to the crib assembly 50 yet within the bottom cover assembly 56, the augmenting features 148 accommodate the expansion of the patient turning devices 202 and prevent “hammocking” of the patient support surface 58 during the movement therapy (i.e., localized alteration or stretching of the patient support surface 58 to a generally concave or arcuate contour that results in localized pressure points). For example, the augmenting features 148 may include the opposing sides 146 of the bottom cover 130 to be at least partially formed from Neoprene and/or other suitably elastic material(s).

Figure 6:
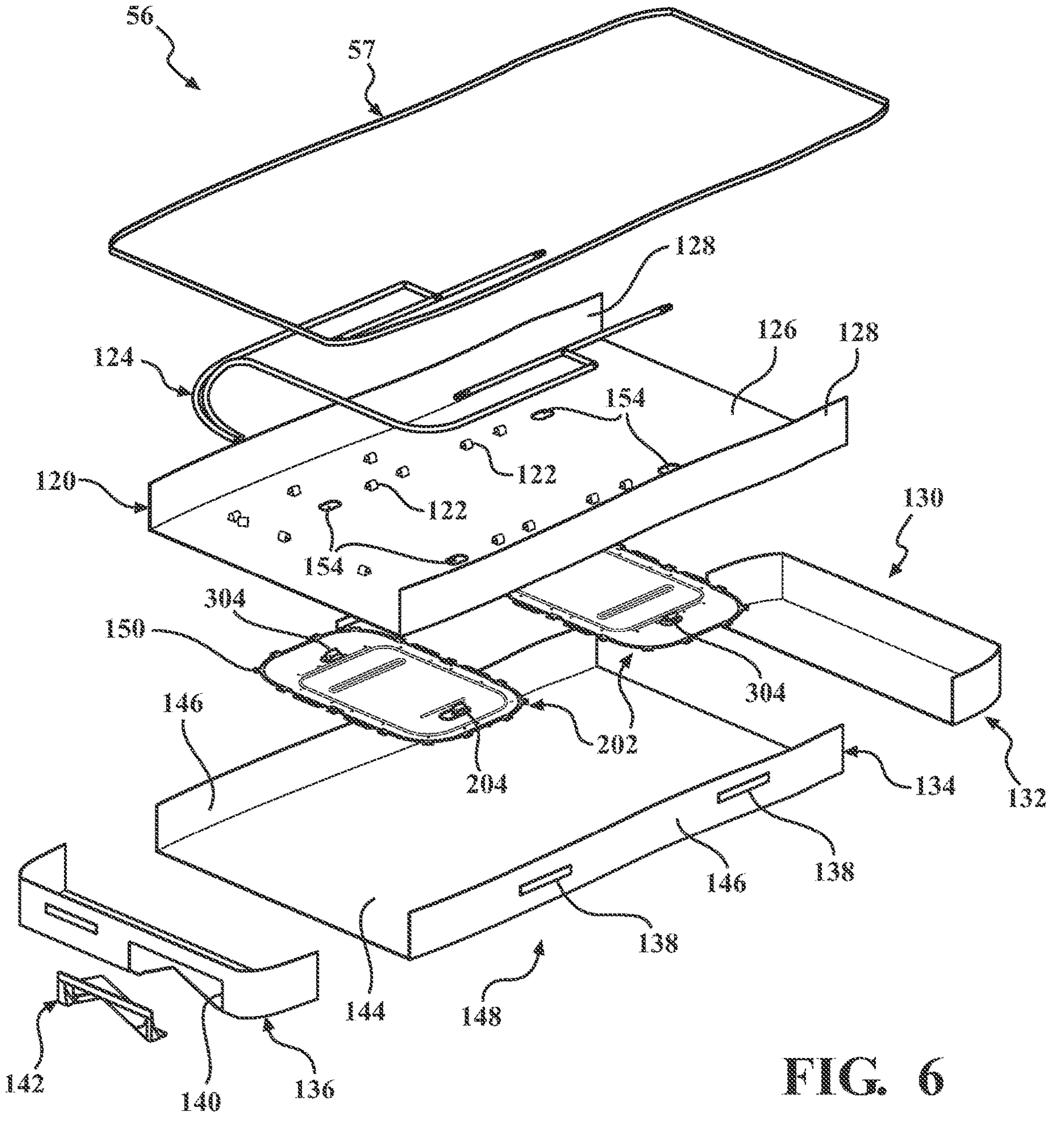
FIG. 6 is an exploded view of a bottom cover assembly.

With continued reference to FIG. 6 and concurrent reference to FIG. 4, the patient support 32 includes at least one of the patient turning devices 202 for moving the patient support surface 58, for example, during the movement therapy. The patient turning devices 202 are positioned between the carrier sheet 120 and the bottom cover 130. More particularly, the patient turning devices 202 are coupled to an underside of the carrier sheet 120 and may not be coupled to the bottom cover 130. The patient turning devices 202 include at least one inlet port 204, 206 configured to be arranged in fluid communication with the second conduit assembly 124, the ports (not shown) of the port connector 142, and the fluid source. The carrier sheet 120 includes at least one aperture 154 sized and positioned such that, when the patient turning devices 202 are coupled to the carrier sheet 120, the inlet ports 204, 206 extend through the apertures 154. In manners to be described, at least one of the patient turning devices 202 is configured to be selectively inflated and deflated in order to move at least a portion of the patient support surface 58 away from or towards the patient support deck 38, respectively.

Figure 7:
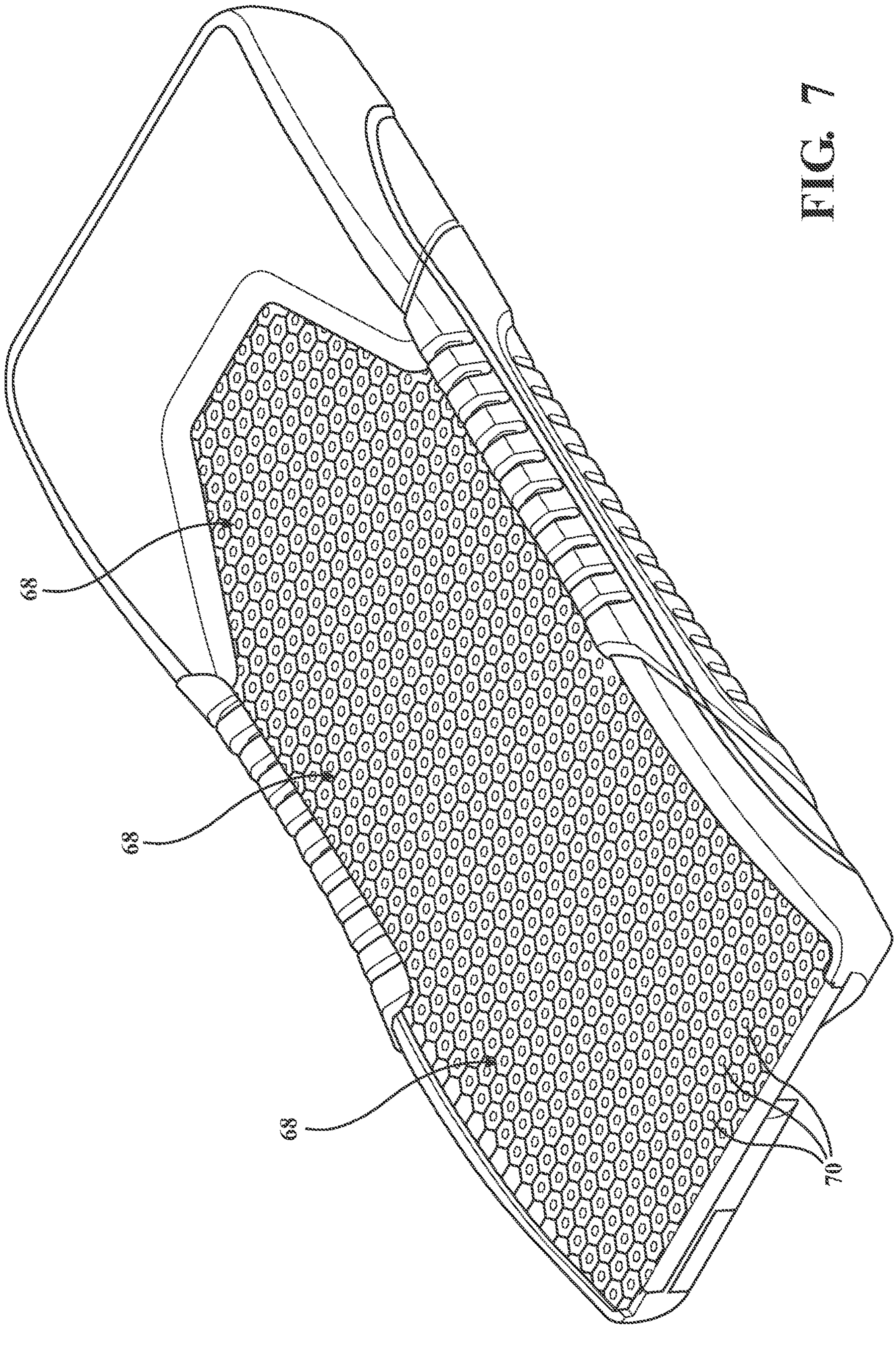
FIG. 7 is a perspective view of the crib assembly illustrating lattices of cells for supporting a patient.
Figure 8:
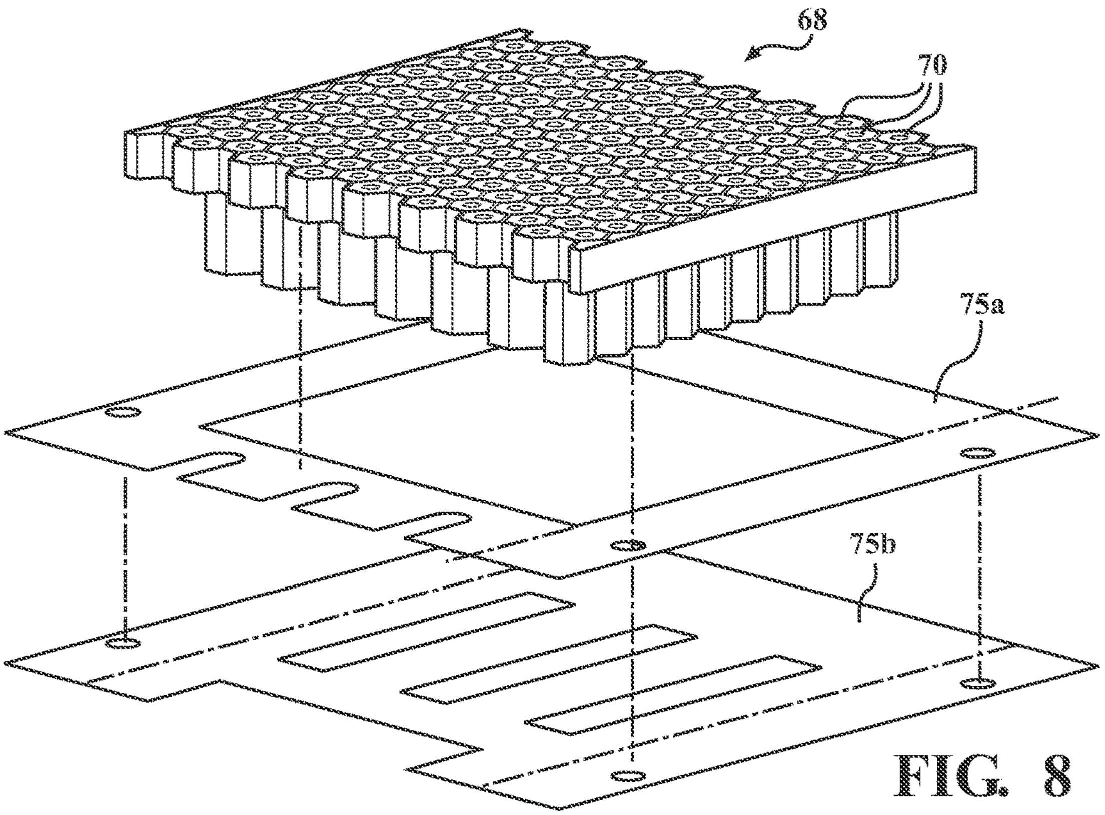
FIG. 8 is an exploded and perspective view of a lattice of cells illustrating coupling features used to connect the lattice of cells to a crib of the crib assembly.
Figure 9:
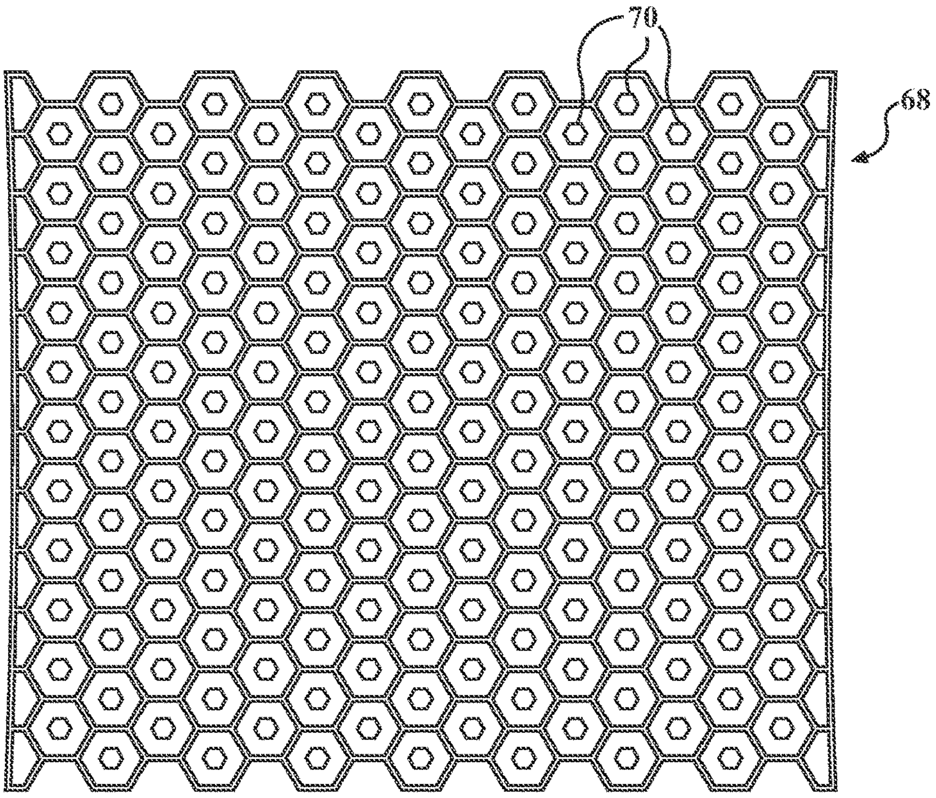
FIG. 9 is a top view of the lattice of cells from FIG. 8.

Referring to FIG. 7, the crib assembly 50 is shown, including each lattice 68 of cells 70. In other versions, the crib assembly 50 may comprise one integrally formed lattice of cells, instead of separately formed lattices 68 that are connected together. In the embodiment shown, as described above, three separate lattices 68 are provided (see FIG. 5) including the head lattice, the torso lattice, and the foot lattice. One objective of the lattices 68 in the patient support design is to minimize the occurrence of pressure sores/ulcers by providing uniform pressure support for a range of patient weights. One method of achieving this objective is to use buckling elements, as is described in greater detail below.

Figure 10:
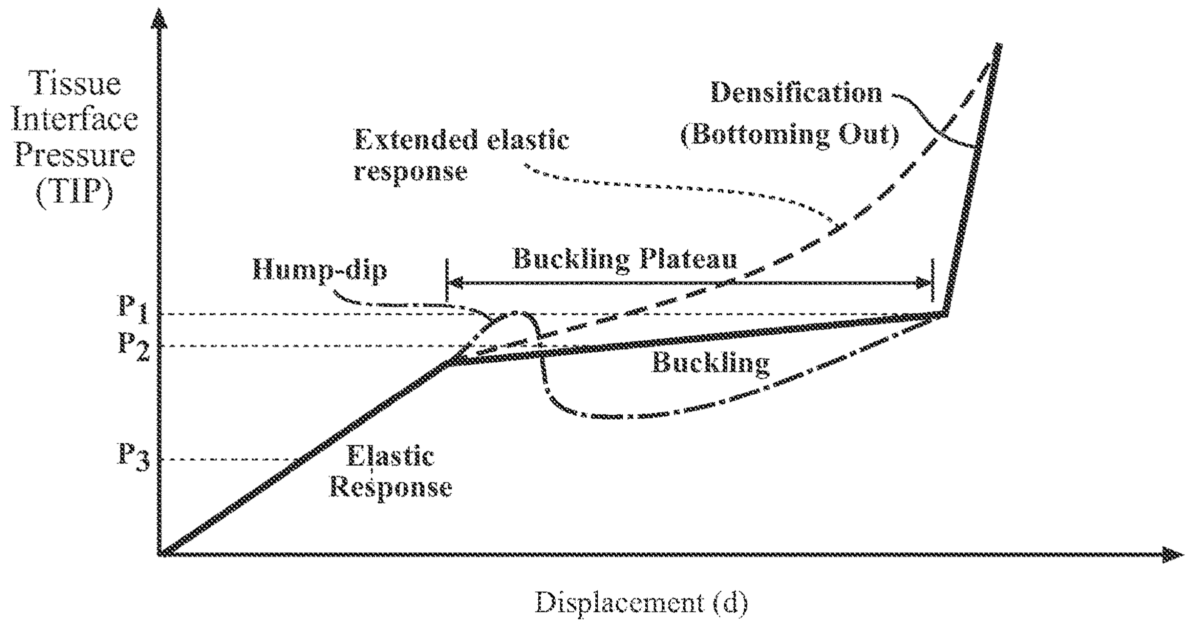
FIG. 10 is an indentation force deflection (IFD) curve of expected pressure exerted on a patient as a function of displacement (d) of the patient support.

An indentation force deflection (IFD) curve is shown in FIG. 10 that generally represents a nearly uniform pressure plateau (buckling plateau) over a wide range of displacements of the patient support when patient weight is applied. This IFD curve shows a range of patient weights (represented by P1, P2, P3). For P2, the change in tissue interface pressures (TIP) varies only slightly over a wide range of displacements as a result of the use of the buckling elements described below, which provide a desirable, nearly uniform pressure plateau. For P3, which represents a lighter patient, the peak TIP is small. For P1, which represents a heavier patient, the patient support 32 starts to bottom out and the peak TIP is comparatively large.

Figure 11A:
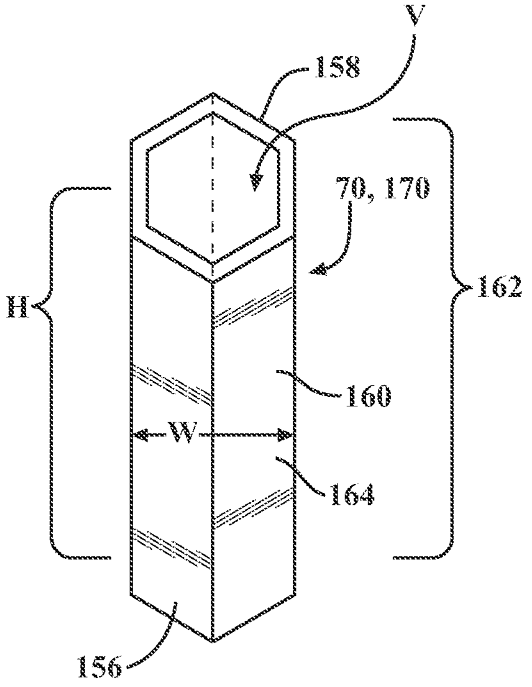
FIG. 11A is a perspective view of a hexagonal shaped column formed from six buckling elements, which are walls, wherein the column has a height (H) and width (W) and wherein the buckling elements define an interior volume (V) within a perimeter of the buckling elements.

In one embodiment, referring to FIG. 11A, each of the cells 70 has a base 156 and extends to a top 158 disposed opposite the base 156. Each of the cells 70 has three or more buckling elements 160 having a thickness and extending from the base 156 to the top 158 to form a column 162 that defines an interior volume (V) within a perimeter of the three or more buckling elements 160.

Relative to the base 156 of the cells 70, this terminology refers to a bottom, base 156, or support for the cells 70. The “base” 56 of the cells 70 is described as oriented vertically below the top 158, which itself is disposed opposite the base 156 (e.g. “above” the base 156.) If the view of the cell is rotated, the top 158 and the base 156 can be substituted for one another. In other embodiments, it is contemplated that the top 158 of the cells 70 can also be the top 158 of the columns 162 themselves because the cells 70 are used to form the columns 162. Similarly, the base 156 of the cells 70 can be the base 156 of the columns 162.

Figure 11B:
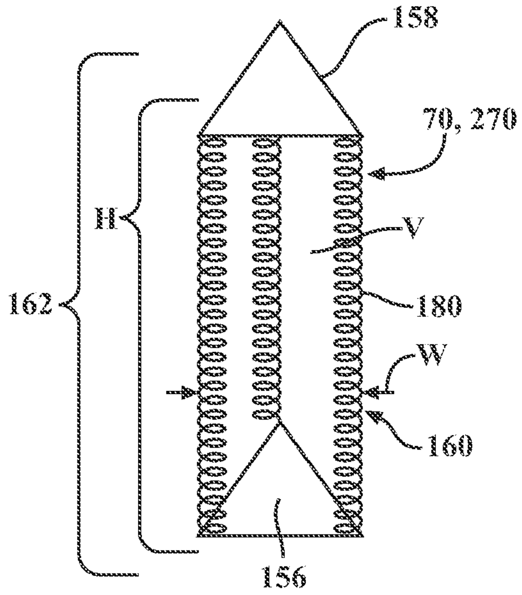
FIG. 11B is a perspective view of a triangular shaped column formed from three buckling elements, which are springs, wherein the column has a height (H) and width (W) and wherein the buckling elements define an interior volume (V) within a perimeter of the buckling elements

Each lattice 68 of cells 70 is not particularly limited in size or configuration. For example, the lattice 68 itself may have a periphery that is configured in any shape including rectangular, trapezoidal, square, or in any other shape. Moreover, the lattice 68 may be of any length, width, and depth. The cells 70 themselves are also not particularly limited in size, shape, or configuration. The cells 70 may be defined by the buckling elements 160 and may be shaped as a triangle, square, rectangle, pentagon, hexagon, etc. In FIG. 11A, the cell 70 is shaped as a hexagon, referred to as hexagonal cell 170. In FIG. 11B, another embodiment of the cell 70 is shaped as a triangle, referred to as a triangular cell 270. In fact, the cells 70 may have any shape that can be formed having buckling elements 160. The cells 70 may be all of the same shape and size or may be of differing shapes and/or sizes. For example, some of the cells 70 may be hexagonal while others may have four sides.

In some embodiments, the cells 70 are disposed in the crib 90 so that no other cells are disposed between the cells 70 and the bottom of the crib 90 or between the cells and the top cover 54. In one words, in some embodiments, the lattices 68 are arranged in the crib 90 so that no lattice is stacked on top of another lattice, i.e., only a single layer of cells 70 is present within the cover assembly 52, between the top and bottom layers of the cover. In some embodiments, the lattices 68 are arranged so that at least one lattice (e.g., the torso lattice) has no other lattices stacked above or below it, but adjacent lattices, such as the head and/or foot lattices, may have other lattices stacked thereon or thereunder. It should be appreciated, however, that other layers, such as the coupling features 74, 75*a*, 75*b*, may be present between the cells 70 and the bottom of the crib 90 or between the cells 70 and the top cover 54.

Figure 13:
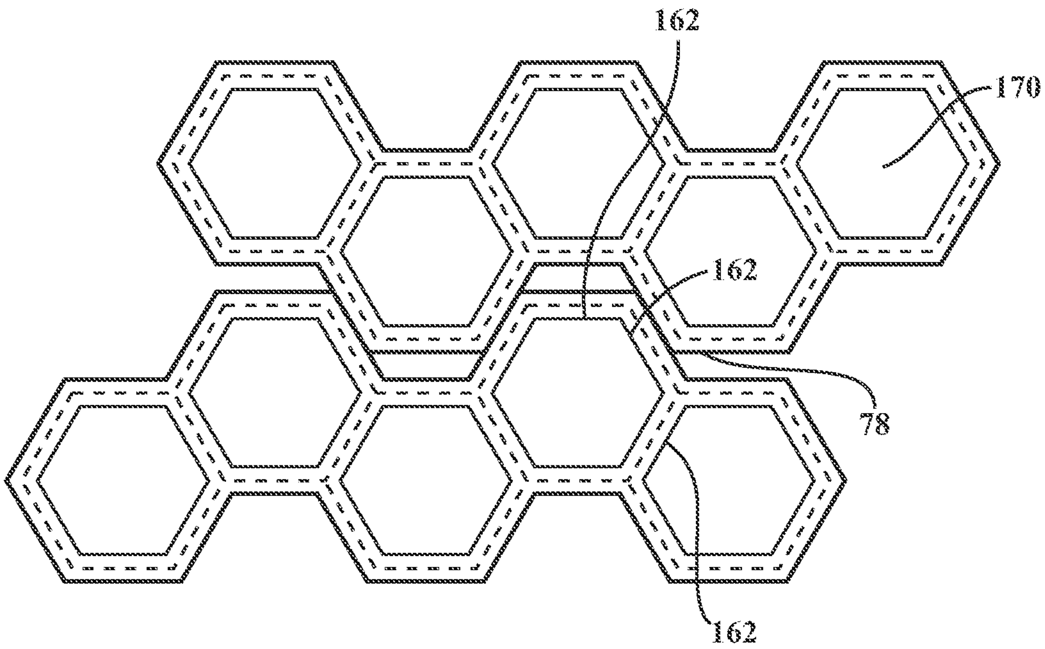
FIG. 13 is a top view of two lattices of identical hexagonal shaped cells, wherein the dashed lines show the center lines of the hexagonal shaped cells demonstrating that the cells do not dovetail neatly.
Figure 14:
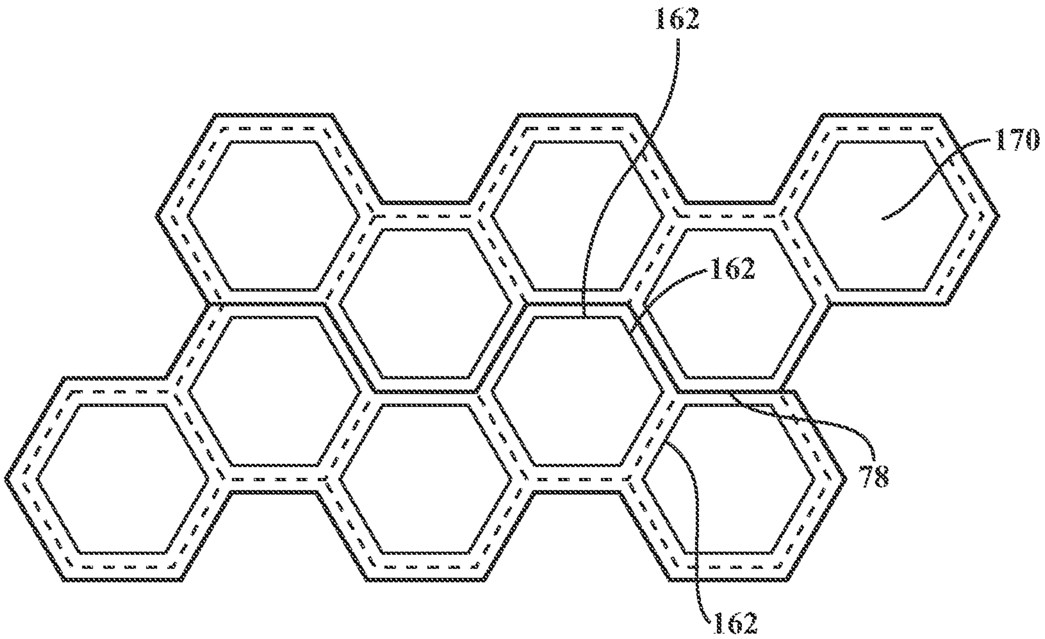
FIG. 14 is a top view of two lattices of hexagonal shaped cells wherein the hexagonal shaped cells are modified to facilitate connection of the two lattices.

The cells 70 may fit together laterally and/or longitudinally in a complementary pattern or may be offset from one another. Where two lattices meet, they may also be adhered to one another at one or more points 78 (FIG. 13). It is theorized that lattices having cells 70 that are hexagonal in shape 170 will not join together neatly without some modification to their geometry at their edges, e.g. compare FIG. 13 to FIG. 14. In FIG. 13, the dashed lines show the center lines of the hexagonal shaped cells 170 which make a hexagonal tessellation. The solid lines show the outer edge of two hexagonal sections. The effect of the thickness (t) of the buckling elements 160 is that the two outer edges do not dovetail neatly. One solution is to form the outer buckling elements 160 at half thickness. Full thickness (t) can thereby be maintained at the interface between the two lattices, as shown in FIG. 14.

Figure 12A:
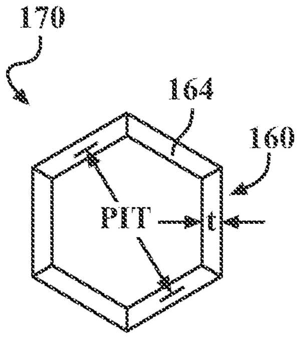
FIG. 12A is a top perspective view of a column that has a pitch (PIT) measured from the center of a first buckling element to the center of a second buckling element.

Referring back to FIG. 11A and to the buckling elements 160, the buckling elements 160 may be any known in the art including walls 164, partitions, coils, springs 180, etc. For example, the buckling elements 160 may be alternatively described as walls 164 of the cell(s) 70. Six walls 164 are present in the embodiment shown in FIG. 11A. If coils or springs 180 are used, then the coils or springs 180 themselves serve as the buckling elements 160 and are not the cells 70 themselves. The walls 164 may be singular or may include two individual walls spaced laterally from one another thereby defining a void therebetween. The void may remain empty or may be filled with any filler in the art. If the walls 164 include two individually spaced walls, then the entire structure of the two walls may be referred to as the wall 164. In FIG. 11B, the buckling elements 160 are individual springs 180 or coils. The buckling elements 160 may alternatively be described as partitions, dividers, etc. The cell 70 may include any number of buckling elements 160. Typically, the number of buckling elements 160 corresponds with the number of sides of the cell 70. For example, a cell 70 that has six buckling elements 160 may have six corresponding sides, e.g. as shown in FIG. 12A. However, this is not required as one side of a cell 70 may include more than one buckling element 160 such that a total number of sides of a cell 70 is not equal to the total number of buckling elements 160 of the cell 70.

Figure 12B:
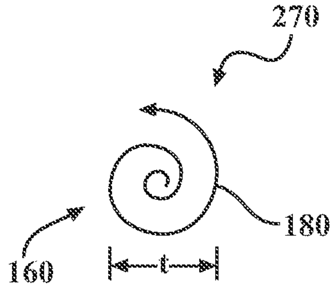
FIG. 12B is a top perspective view of an individual buckling element that is a spring.

Referring to FIGS. 12A and 12B, the buckling elements 160 have a thickness (t) which may be consistent or may vary. For example, the buckling elements 160 may have a thickness (t) of from 0.175 inches to 0.220 inches, from 0.133 inches to 0.167 inches, or from 0.123 inches to 0.155 inches. In embodiments in which multiple lattices are employed, each lattice may have cells 70 with walls 164 of a different thickness (t) than the walls 164 of the other lattices or the walls 164 may be of the same or similar thickness (t). The thickness (t) may be defined as the thickness of the walls 164 (FIG. 12A) or, for example, as the thickness or width of a spring 180 or coil (FIG. 12B). In some embodiments, described further below, the thickness (t) at the base 156 and the top 158 may be different. In this case, calculations below that include thickness (t) as a variable may mean average thickness (t) of the wall 164 or spring 180 or maximum or minimum thickness of the wall 164 or spring 180, which are the largest and smallest values of thickness (t).

Figure 18A:
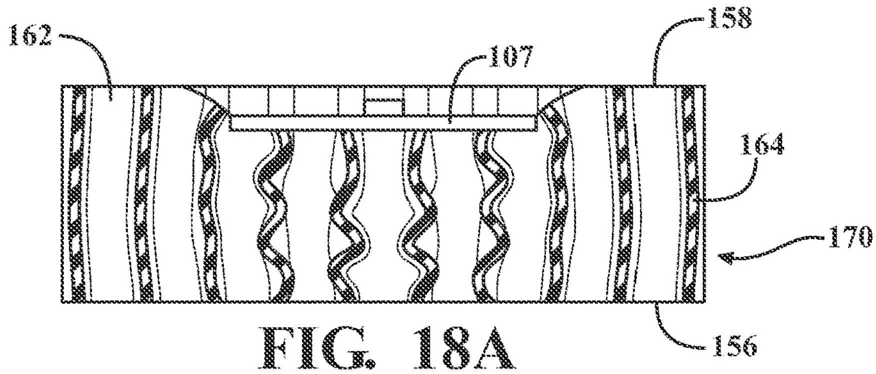
FIG. 18A is a side cross-sectional view of a lattice of cells each having a base, a top disposed opposite the base, buckling elements extending from the base to the top to form a column, wherein an indenter is exerting pressure on the top resulting in an altered buckling profile as compared to the lattice of FIG. 18B.

The buckling elements 160 compress and then buckle under pressure, i.e., move laterally, so as to balance pressure exerted upwards on the patient (see FIG. 18A, for example). The buckling elements 160 offer little resistance to deformation thereby reducing pressure on the patient.

The buckling elements 160 extend from the base 156 to the top 158 to form the column 162 that defines the interior volume (V) within a perimeter of the buckling elements 160, e.g. as shown in FIG. 11A. The interior volume (V) is typically from 4 cubic inches to 18 cubic inches, from 12 cubic inches to 18 cubic inches, from 4 cubic inches to 6 cubic inches, or from 8 cubic inches to 10 cubic inches. In embodiments in which multiple lattices 68 are employed, each lattice may have columns 162 with a different interior volume (V) than the columns of the other lattices or the columns may have the same or similar interior volume (V). The interior volume (V) may be filled with air, any gas, or any suitable filler. The filler of the interior volume (V) may have physical properties chosen by one of skill in the art. For example, the filler may have a particular Young's modulus that may be used to enhance the buckling properties of the cells 70.

In various embodiments, the column 162 also has a maximum height (H) measured from the base 156 to the top 158 and a maximum width (W), as also shown in FIG. 11A, with a maximum value of the height (H) being at least 2.0 times a maximum value of the width (W). In various embodiments, the maximum value of the height (H) is at least 2.5 times a maximum value of the width (W), or may be at least 3.0 times a maximum value of the width (W).

Figure 16:
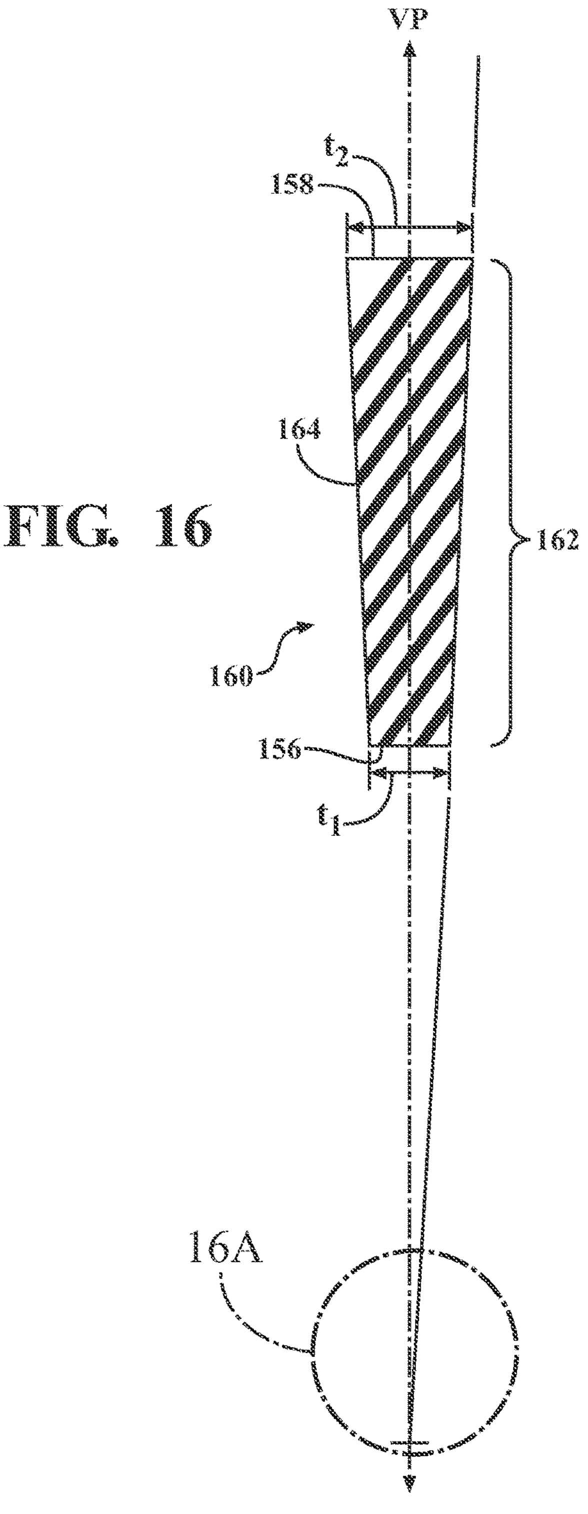
FIG. 16 is a cross-sectional view of a buckling element that has a first thickness (t1) measured at the base and a second thickness (t2) measured at the top wherein the second thickness is greater than the first thickness.
Figure 16A:
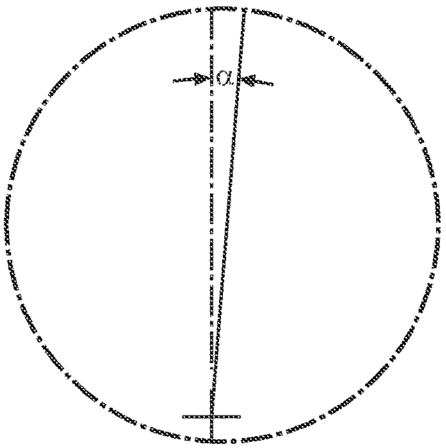
FIG. 16A is a magnified view of the draft angle ($\alpha$) of FIG. 16.

The terminology "maximum value" describes the maximum height (H) of the column 162 or the maximum width (W) of the column 162. For example, if the column 162 has an uneven top 158 or base 156, then the maximum height (H) is the largest value measured from a point at the base 156 to a point at the top 158, i.e., the distance between the farthest points at the base 156 as compared to the top 158. The maximum width (W) of the column 162 may be measured between the centers, outer surfaces, or any other two points, of two or more buckling elements 160. However, depending on which points are chosen, individual width measurements may be different. The maximum width (W) of the column 162 may also be described as pitch (PIT) which may be measured between the center of any two of the buckling elements 160, e.g. as shown in FIG. 12A. Moreover, if the buckling elements 160 taper from top 158 to bottom or bottom to top 158, e.g. as shown in FIG. 16, or have irregular shapes, then the widths may be different depending on what two points are chosen. For that reason, the terminology "maximum width" describes the largest of these measurements.

Relative to choosing height (H) and thickness (t), the longer the buckling plateau (see FIG. 10), the wider the range of patient weights that can utilize the patient support 32 in a manner that mitigates the development of pressure sores and ulcers. Therefore, by optimizing the height (H) and optimizing the thickness (t), the buckling pressure can be adjusted and selected which can delay densification and bottoming out of the patient support 32.

Figure 15:
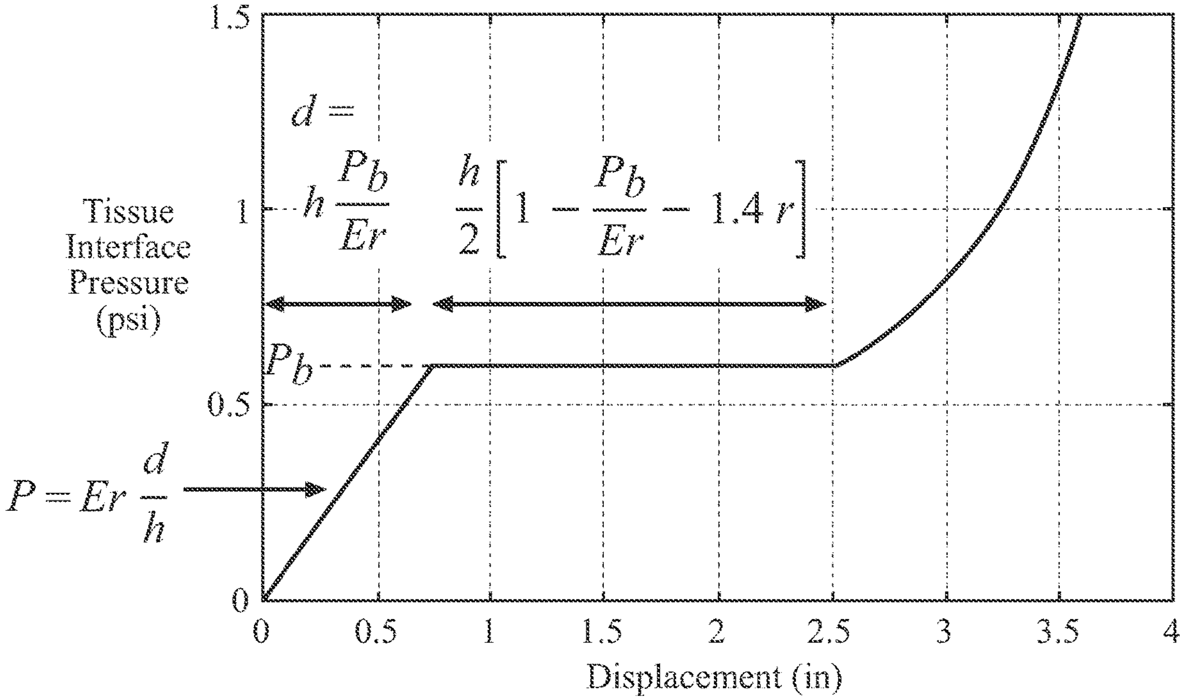
FIG. 15 is another IFD curve of tissue interface pressure (TIP) exerted on a patient as a function of displacement (d) of the patient support in inches and includes theorized formulas that can be used to calculate the IFD curve.

The column 162 is generally configured to exhibit a consistent or uniform patient pressure when the patient places their weight on the patient support 32, e.g. as shown in the theoretical IFD curve of FIG. 15. FIG. 15 shows compression and buckling of the buckling elements 160 in the patient support 32 when a patient load is added from the top 158. More specifically, the column 162 is generally configured to exhibit a consistent patient plateau pressure ($P_b$) of ±0.1 psi (pounds per square inch) to the patient over a compression displacement of the column 162 of 0.75 to 2.5 inches. Patient pressure (P) is measured according to forces sensed on a circular planar indenter of 8 inch diameter (e.g., 8 inch indenter plate) that was pressed into the patient support 32 to the noted displacements.

In one embodiment, the patient support 32 comprises the lattice 68 of the cells 70 having the base 156, the top 158 disposed opposite the base 156, and three or more buckling elements 160 having the thickness (t) and extending from the base 156 to the top 158 to form the column 162 that defines the interior volume (V) within the perimeter of the three or more buckling elements 160, wherein the thickness (t) and the width (W) are in a ratio of from 0.06:1 to 0.12:1. For example, the thickness (t) and the width (W) may be in a ratio of from 0.08:1 to 0.11:1.

A hexagonal shape of the column 162 and cell 170 has a series of advantages over four buckling elements 160 that form a square or rectangular shaped column or cell. For example, a hexagonal shape can reduce "hump-dip" behavior that would be predicted in simulated IFD curves. The hexagonal shape can also result in less hammocking due to the zig-zag arrangement of the buckling elements 160. In such a case, the patient support 32 may undergo lateral strain before the buckling elements 160 go into tension, such as 15% lateral strain. Moreover, the hexagonal shape requires less material to be used to form the buckling elements 160 and the patient support 32 overall to achieve similar buckling pressures as would be observed using a square shape.

A lattice 68 of cells 170 which each have a hexagonal shape can be described by four parameters that are employed in Equations 1 and 2 below to determine the characteristics of the theoretical IFD curve shown in FIG. 15. A first parameter is the Young's modulus (E) of the material used to form the buckling elements 160. The lattice 68, the cells 170, the column 162, and the buckling elements 160 may be formed using any material known in the art, including elastic and/or visco-elastic materials. A second parameter is the height of the column 162 or lattice, (h)(same as previous "H"). A third parameter is a pitch of the lattice (PIT), which can be measured as a distance from the center of one buckling element to a center of another buckling element in one hexagonal cell 170, such as is shown in FIG. 12A. A fourth parameter is thickness of the buckling element (t), as shown in FIG. 12A. Based on these parameters, the following calculations can be made wherein the thickness (t) is represented as (w) and the pitch (PIT) is represented as (p). The volume fraction of material used to fill the cell is designated (r) and is reported as a volume of material as a fraction of the total lattice volume and ($P_b$) is the buckling pressure of the pressure plateau. In one embodiment, the constant (k) has a theoretical value of 3.4 for lattices 68 that comprise hexagonal shaped cells 170 and 2.3 for lattices that comprise square shaped cells (not shown in the Figures):

$$r = 2\left(\frac{w}{p}\right) - \left(\frac{w}{p}\right)^2 \quad \text{Equation 1}$$

$$P_b = kEr^3 \quad \text{Equation 2}$$

Applying the results of Equations 1 and 2 to the equations shown in FIG. 15 shows that displacement (d) scales with lattice height, (h). FIG. 15 also shows how elastic and plateau portions of the curve can be calculated from the design parameters and displacement (d).

Figure 15A:
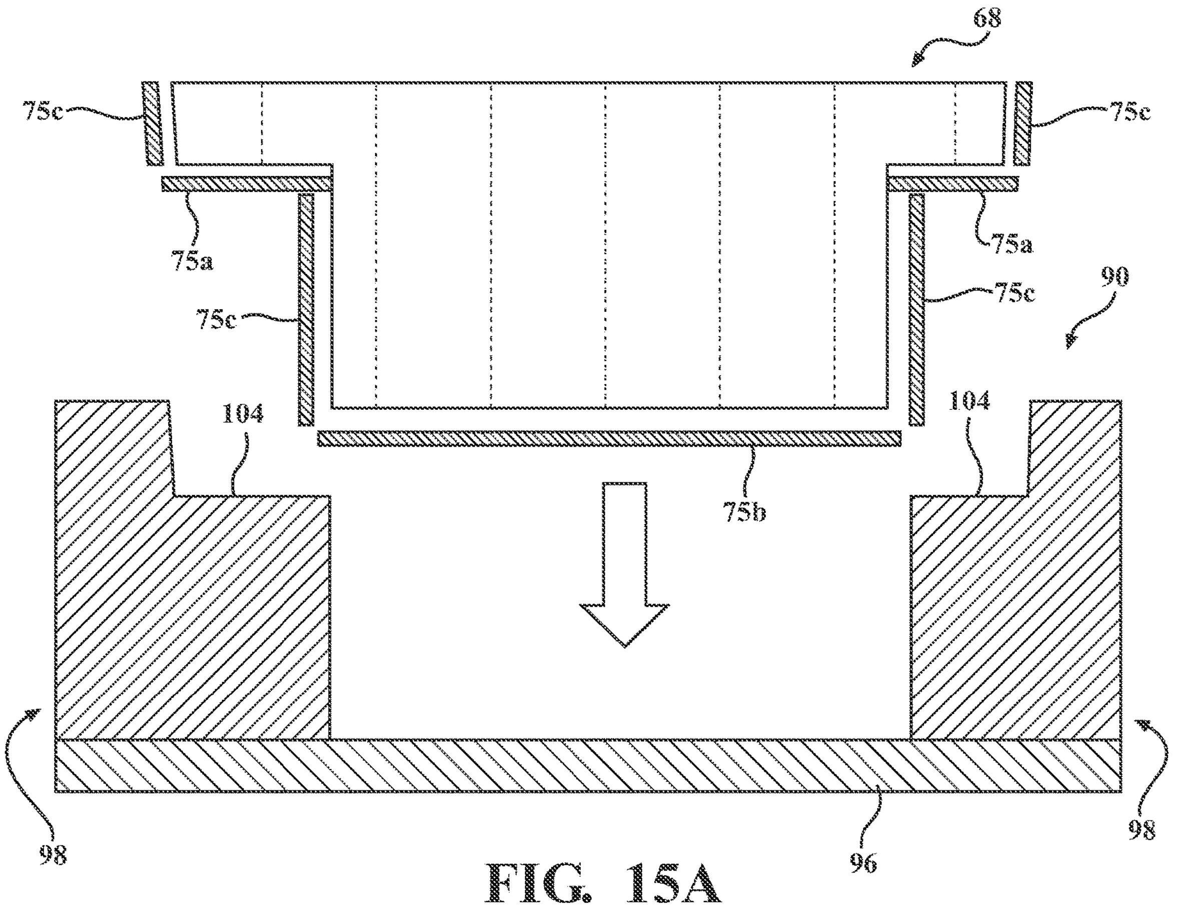
FIGS. 15A and 15B are cross-sectional views of a lattice illustrating connection of the lattice to the crib of the crib assembly.
Figure 15B:
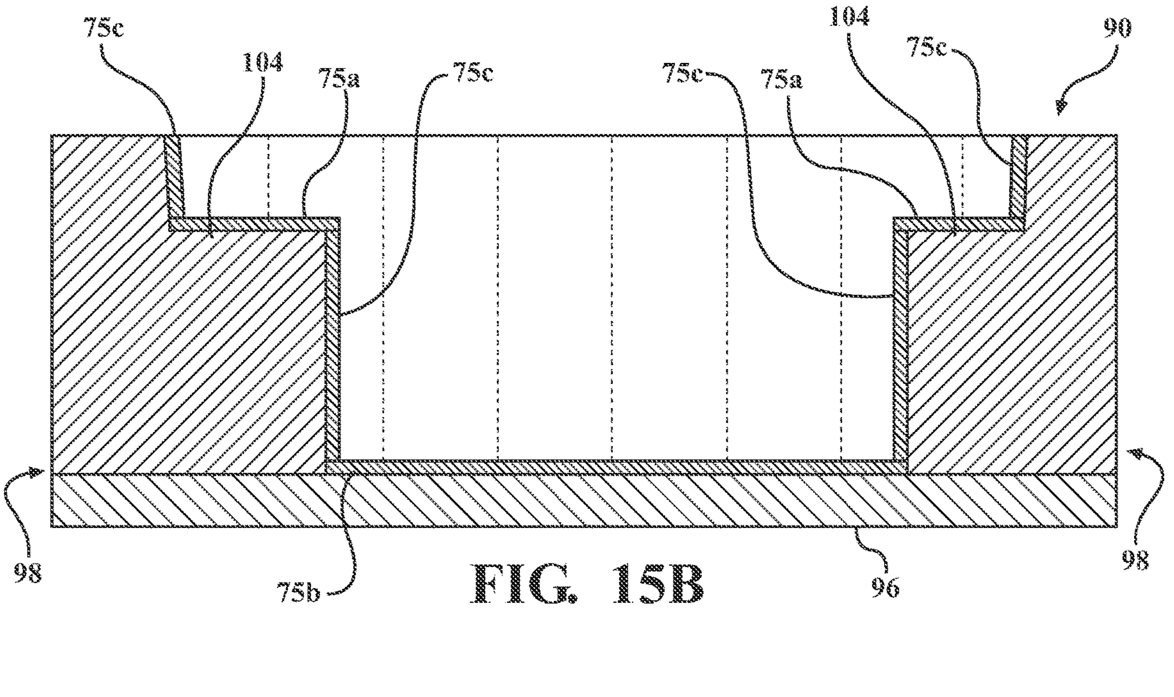

Undesirable buckling can occur at the edge of a lattice 68. For this reason, and to provide proper support for the patient during ingress, egress, and turning, the edge of the lattice 68 can be secured to the crib 90 e.g. as shown in FIGS. 15A and 15B. The lattice 68 can be coupled to the crib 90 adjacent a periphery of the lattice 68 to reduce hammocking of the periphery of the lattice 68 upon receiving the weight of the patient on the lattice 68. For example, tall lattices, e.g. having cells 70 with a height (H) of greater than twice their width (W), are relatively weak at their edges. These lattices 68 tend to fold in half rather than buckling with a sinusoidal mode. Accordingly, such lattices 68 can be supported at their edges. Connection of the torso lattice to the crib 90 is shown for illustration in FIGS. 15A and 15B.

The lattice 68 of cells 70 is disposed on one or more support sections of the crib 90. In one embodiment, the crib 90 has the base layer 96 and the two side frame members 98 extending from the base layer 96 to provide the ledge 104 for supporting opposing cantilevered portions of the lattice 68. The side frame members 98 are disposed opposite each other and the lattice 68 is disposed between the side frame members 98 and on the base layer 96 and the ledge 104. Although not shown in FIGS. 15A and 15B, the torso lattice has two additional cantilevered portions that rest on the lower conformable layer 62. The crib 90 is not limited to these embodiments and may have any suitable shape. The shape of the crib 90 is typically complementary to the shape of the lattice(s) 68 but may be different. It should be appreciated that the cells 70 in the cantilevered portions may be of the same width (W), and/or may have the same wall thickness (t), and/or may have the same shape (e.g., hexagonal) as the remaining cells, and may be contiguous with the other cells in upper profile, but the cells 70 in the cantilevered portions have a shorter column height (H) to provide the cantilevered effect. Thus, the lattice 68 of cells 70 may be formed as a lattice of identical cells, and then trimmed to form the cantilevered portions in the shape shown in FIG. 15A or the lattice 68 of cells 70 may be formed with the cantilevered portions being integral therewith.

The lattice 68 is connected to the crib 90 using coupling features 75*a*, 75*b*, 75*c*, which may comprise one or more layers. In one embodiment, coupling features 75*a*, 75*b* connect to the lattice 68 at its bottom and beneath each cantilevered section. In one embodiment, coupling features 75*c* connect to the lattice 68 on its lateral sides as well, as shown in FIGS. 15A and 15B. The coupling features 75*a*, 75*b*, 75*c* may comprise one or more adhesive layers, layers of connecting material such as non-woven fabric (e.g., Nylon 6, 6), combinations thereof, and the like. The coupling features 75*a*, 75*b*, 75*c* may be connected to the lattice by adhesive, heat-sealing, ultrasonic welding, or the like. The coupling features 75*a*, 75*b*, 75*c* may be connected to the crib 90 by adhesive, heat-sealing, ultrasonic welding, or the like. During manufacture, the coupling features 75*a*, 75*b*, 75*c* may be first connected to the lattice 68 and then to the crib 90, or may be connected to the crib 90 first and then to the lattice 68. The bonding of the lattice 68 to the crib 90, especially at its periphery, minimizes hammocking.

The walls 164 of the buckling elements 160 may be tapered, e.g. as shown in FIG. 16. For example, the thickness of the base 156 of the walls 164 can be thinner than the thickness of the top 158 of the walls 164. This may flatten the plateau of the IFD curve and provide more controlled buckling. For example, the lattice 68 typically buckles progressively from base 156 to top 158. In addition, such an embodiment has a benefit of providing some draft for a molding tool. In various embodiments, the draft angle is less than 1, 0.75, 0.5, 0.25, or 0.1, degrees, and is utilized to linearize the buckling curve or at least prevent/minimize upward slope which forces buckling to start at the base 156 of the column 162 and work progressively towards the top 158. For example, when a slight draft angle is utilized, the buckling curve tends to flatten, which is desirable. In the embodiment shown in FIG. 16, each of the three of more buckling elements 160 has a first thickness (t1) measured at the base 156 and a second thickness (t2) measured at the top 158 wherein the second thickness is greater than the first thickness such that a ratio of second thickness (t2) to first thickness (t1) is greater than 1.1:1. In some embodiments, the ratio is from 1.1:1 to 1.3:1, from 1.1:1 to 1.27:1; or from 1.2:1 to 1.26:1.

Figure 17:
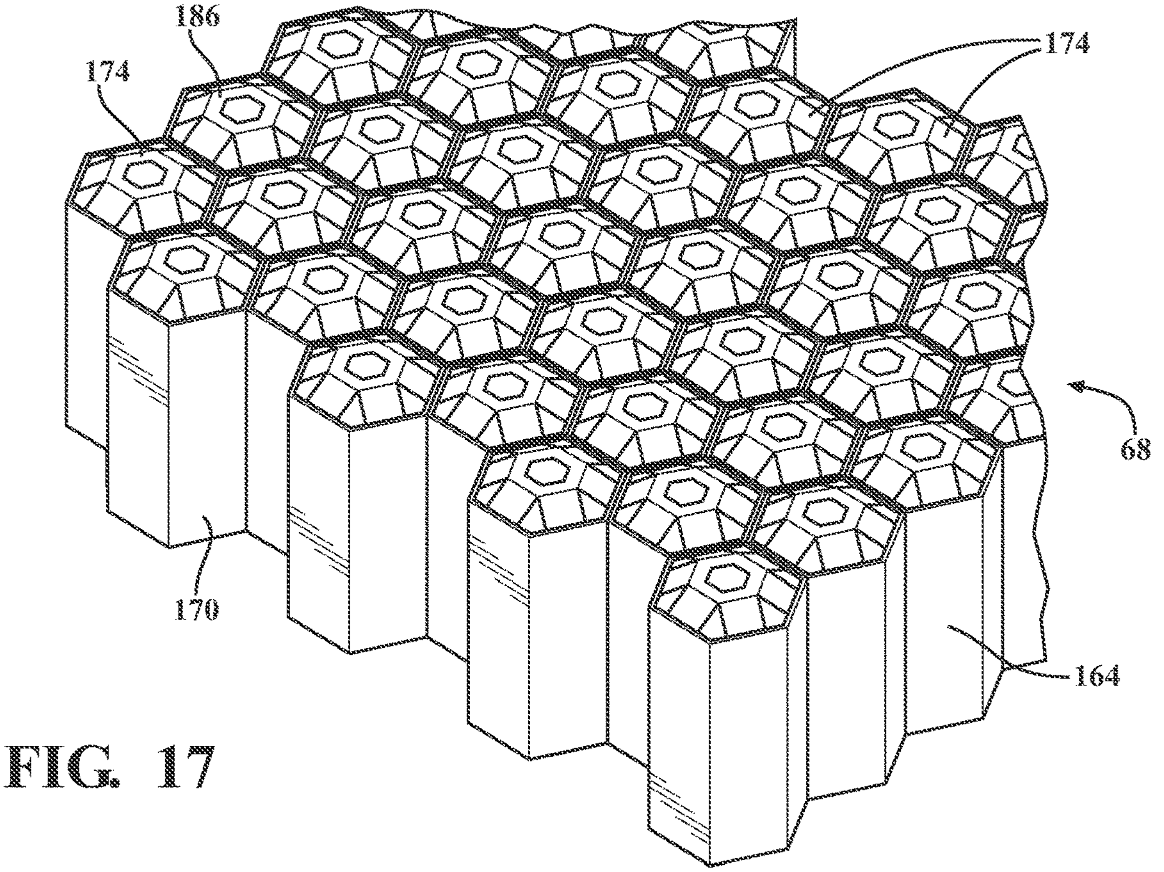
FIG. 17 is a perspective view of a lattice of cells each having a base, a top disposed opposite the base, six buckling elements extending from the base to the top to form a column, and a cap disposed on the six buckling elements to disperse compression pressure exerted on the top.

In a further embodiment, as shown in FIG. 17, caps 174 may be disposed on the buckling elements 160 to disperse compression pressure. In many instances, without caps, pressure is transferred from the buckling elements 160 (e.g., walls 164) to small surfaces of the patient's skin. The caps 174 can create a transition structure which takes a high pressure profile of the column 162 and spreads it onto a larger surface resulting in a much lower tissue interface pressure (TIP) seen on the skin.

Figure 18B:
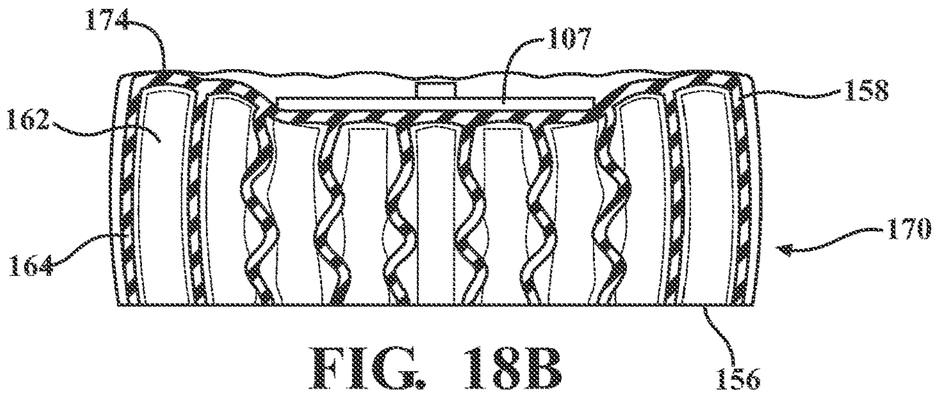
FIG. 18B is a side cross-sectional view of a lattice of cells each having a base, a top disposed opposite the base, buckling elements extending from the base to the top to form a column, and a cap disposed on the six buckling elements to disperse compression pressure exerted on the top with an indenter resulting in an edge effect wherein the cap causes the buckling element just beyond the cap to buckle which is different as compared to the lattice of FIG. 18A.

As shown in FIG. 17, the cells 170 are hexagonal in shape and include caps 174. In such an embodiment, the lattice 68 can be tuned to provide the optimal buckling pressure and the caps 174 can be designed to spread out TIPs. In one embodiment, when a cap 174 is used, the cap 174 has a suitable bending stiffness, as required to spread TIP away from the walls 162 of the cell 170. In one embodiment, the cap 174, when pressed flat, provides a uniform pressure that matches the buckling pressure of the lattice 68, in other words, that matches the pressure from the buckling elements 160 (e.g. walls of the cell 170). FIGS. 18A and 18B illustrate subtle variations in buckling of the buckling elements 160 when no caps are present (FIG. 18A) as compared to when caps are employed (FIG. 18B). As shown in FIG. 18B, the buckling elements 160 outside of the periphery of the indenter 107 tend to provide additional buckling, thereby illustrating how the TIPs are spread out better when caps 174 are employed.

FIG. 19 illustrates a simulation in which the caps 174 have flattened and the buckling elements 160 (e.g. walls 164 of the cell 170) are just starting to buckle. A wide range of cap designs are possible. In particular, the top surface of the caps 174 can be designed in keeping with desired industrial design and the thickness and structure of the caps 174 can be chosen to provide uniform pressure when flattened.

FIGS. 20A-20C illustrate side cross-sectional views of three optional designs for the caps 174 including a solid dome 274 (FIG. 20A), a dome 374 that defines an orifice 208 or opening therein, such as a single, central opening (FIG. 20B), and a buttressed dome 474 (FIG. 20C). The solid dome 274 is similar to a cantilever beam, rotated around an axis. Flattening the beam introduces bending stresses that are supported by the pressure on top of the dome. The dome 374 that defines an orifice 208 allows air flow into the column 162. In this embodiment, no TIP is provided at the orifice but uniform pressure can be achieved over the rest of the dome 374. The buttressed dome 474 allows for less material to be used in the cap.

Figure 21:
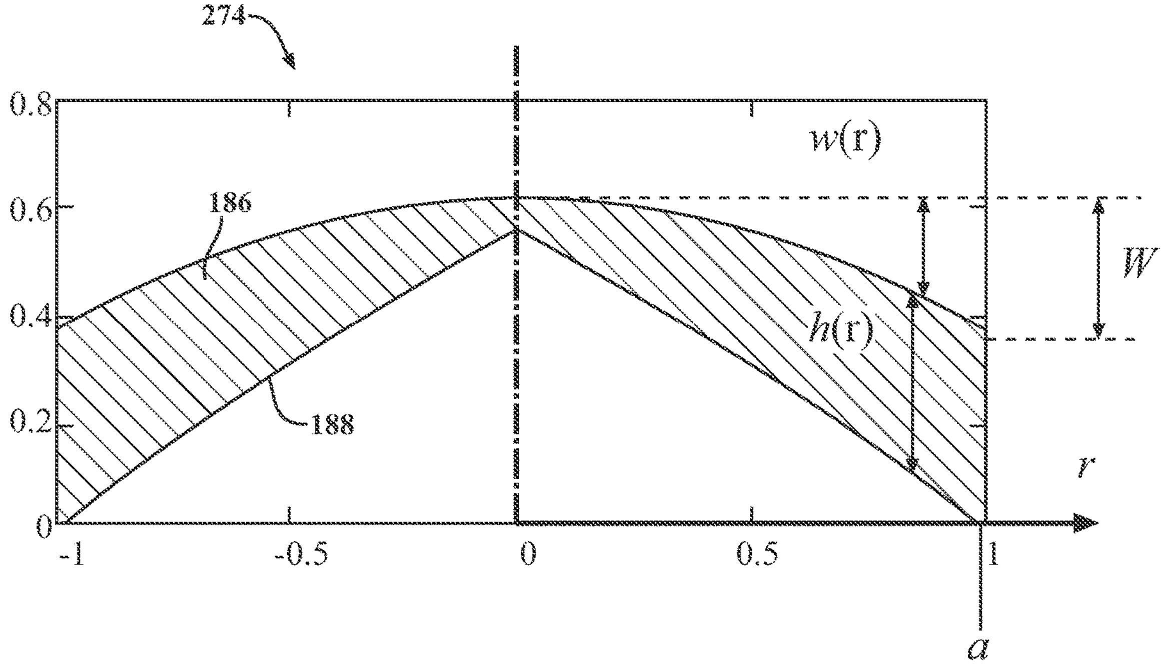
FIG. 21 illustrates variables of a solid dome.

A section of a solid dome 274 is shown in FIG. 21. The properties of the solid dome 274 can be approximately calculated using thin plate theory assuming a Young's modulus of E=41.5 psi. Moreover, when using a weight such as the aforementioned planar indenter 107, a pressure of Pb=0.65 psi can be calculated to push the dome flat, which involves displacing the peak by w=0.25 in. The thin plate equations for the top surface profile, w(r), and thickness profile, h(r), are as follows:

$$w(r) = w\left[1 - \left(\frac{r}{a}\right)^2\right]$$

$$h(r) = \left[\frac{3}{2}(1 - v)\frac{P_b}{E}\frac{a^2}{w(0)}r^2\right]^{1/3}$$

Where (w) is the height that the cap extends above the buckling elements, (a) is the radius of the cap, (u) is the Poisson's ratio of the cap material, (E) is the Young's modulus of the cap material, and (Pb) is the pressure exerted by the cap when pressed flat, which may be chosen to match the buckling pressure of the buckling elements that support the cap.

Relative to these equations, all the dimensions can be scaled by the same amount. Accordingly, dome design can be scaled to match different lattice pitches (p).

Figure 22A:
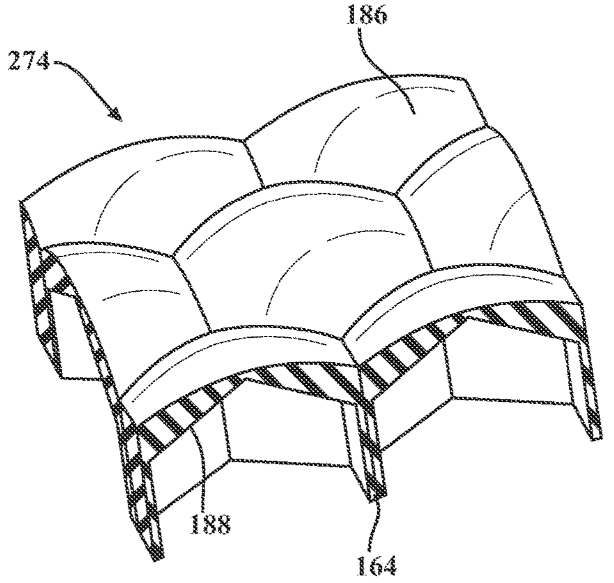
FIG. 22A is a perspective cross-sectional view of a series of caps (domes) that are described as solid domes.
Figure 22B:
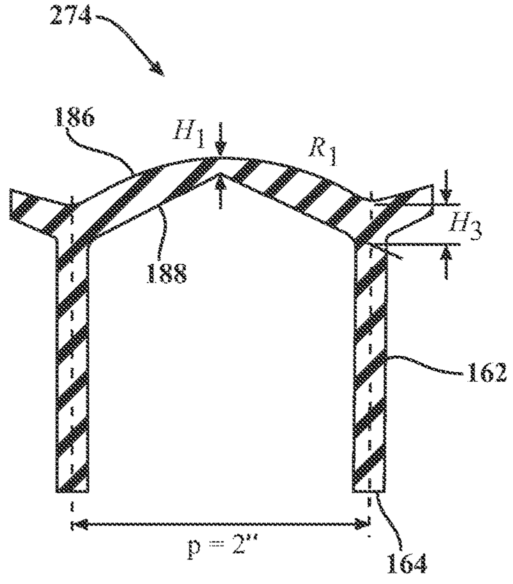
FIG. 22B is a side-cross-sectional view of a cap that is described as a solid dome that includes various radii and heights.

FIGS. 22A and 22B illustrate geometry that can be used to model solid domes 274. The model helps to refine the dimensions from the thin plate theory. The model has periodic boundary conditions, to represent an infinite lattice 68 of cells 170 having a hexagonal shape. The model covers four hexagonal shaped cells 170. In this embodiment, the cell pitch (p) is 2 inches, the thickness (t) of the buckling elements 160 (i.e., vertical walls 164) is 0.16 inches and 18 variants of the dome geometry can be simulated, as set forth in the Table below:

| R1 (in) | H1 (in) | H3 (in) | R1 (in) | H1 (in) | H3 (in) |
|---|---|---|---|---|---|
| 3.4 | 0.07 | 0.43 | 7.8 | 0.07 | 0.40 |
| 3.4 | 0.07 | 0.38 | 7.8 | 0.07 | 0.30 |
| 3.4 | 0.07 | 0.33 | 7.8 | 0.07 | 0.20 |

-continued

| R1 (in) | H1 (in) | H3 (in) | R1 (in) | H1 (in) | H3 (in) |
|---|---|---|---|---|---|
| 2.6 | 0.07 | 0.39 | 4.0 | 0.07 | 0.40 |
| 2.6 | 0.07 | 0.34 | 4.0 | 0.07 | 0.30 |
| 2.6 | 0.07 | 0.29 | 4.0 | 0.07 | 0.20 |
| 2.1 | 0.07 | 0.36 | 2.7 | 0.07 | 0.30 |
| 2.1 | 0.07 | 0.31 | 2.7 | 0.07 | 0.20 |
| 2.1 | 0.07 | 0.26 | No domes - hex only | | |

In a simulation, domes can be compressed with a planar indenter 107 until the average pressure on the plate is 0.65 psi (9.0 lbf over the 13.9 $in^2$ area of the model), which is a target buckling pressure for the lattice 68 of cells 170 having a hexagonal shape. The distribution of the pressure over the plate can then be examined. It is found that the design which gives the most uniform distribution has dimensions R1=4.0 inches, H1=0.07 inches, H3=0.30 inches. Other combinations of dimensions also give a nearly uniform pressure distribution, e.g. R1=7.8 inches, H1=0.07 inches, H3=0.40 inches. This demonstrates that there is some flexibility in the design. For example, the radius R1 can be chosen according to the desired height by which the caps extend above the buckling elements, and there is a corresponding value of H3 which gives good pressure distribution. Caps with the same value of R1 but a smaller value of H3 tend to concentrate support at the outer edges of the cap. Caps with the same value of R1 but a larger value of H3 tend to concentrate support on the center of the cap.

Figure 23A:
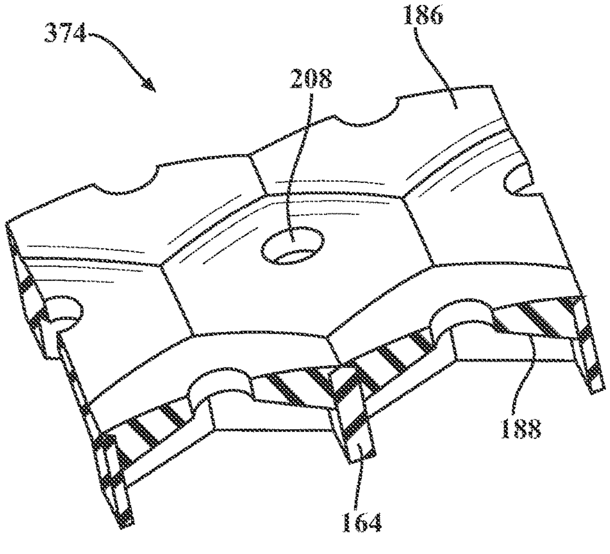
FIG. 23A is a perspective cross-sectional view of a series of caps (domes) that are described as domes that define one or more openings therein.
Figure 23B:
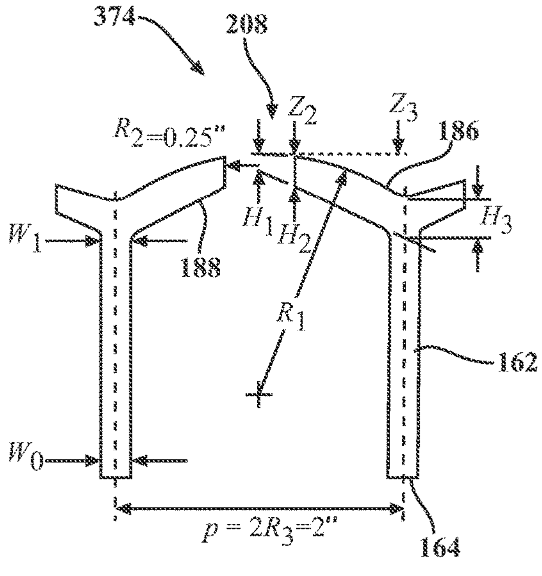
FIG. 23B is a side-cross-sectional view of a cap that is described as a dome that defines an opening therein and that includes various radii and heights.
Figure 24:
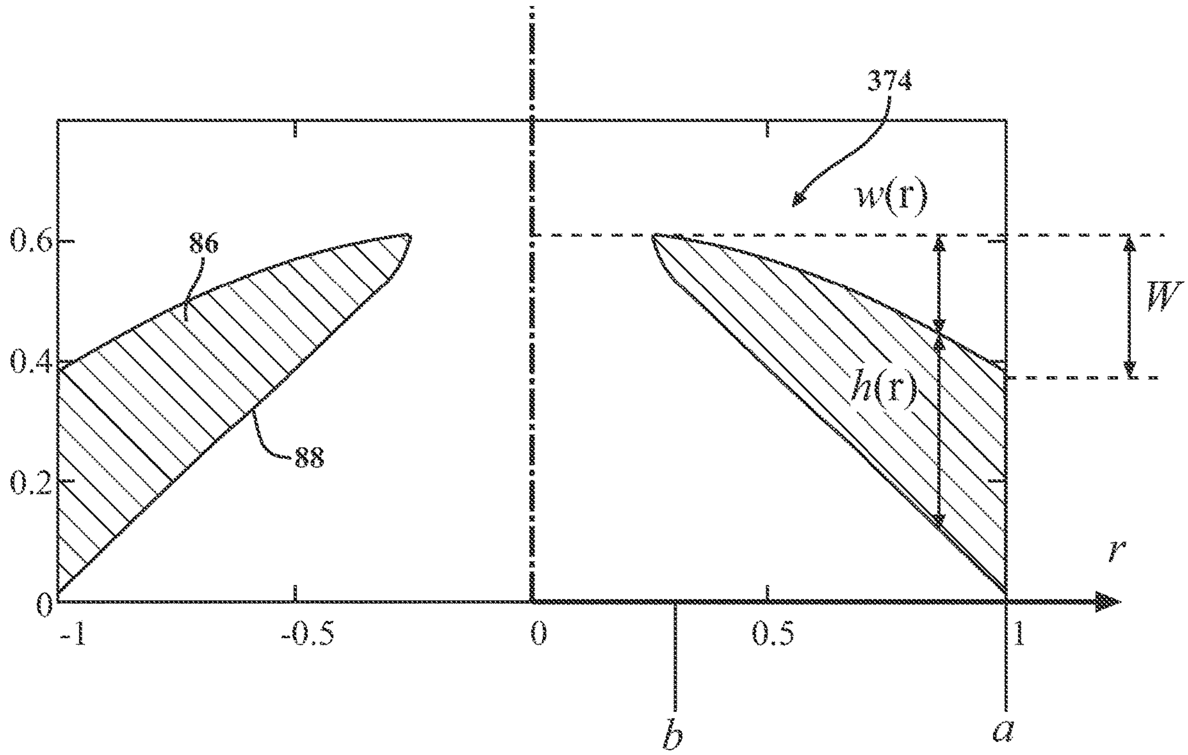
FIG. 24 illustrates variables of a dome that defines an opening therein.

In other embodiments, such as is shown in FIG. 23A and FIG. 23B, geometry of a dome 374 with openings 208 is shown. As with the solid dome 274, the top surface 186 is spherical and the bottom surface 188 is conical. This means that the dome section is defined by $R_1$, $H_3$ and one of $H_1$ or $H_2$, as shown in FIG. 23B. The values of $H_1$ or $H_2$ are linked by the slope of the cone by the following Equations:

$$\frac{H_2 + Z_2 - H_1}{R_2} = \frac{H_3 + Z_3 - H_1}{R_3}$$

wherein, as is shown in FIG. 23B:

$R_3$=p/2 is the radius at which $H_3$ is measured;

R2 is the radius of the opening 208, where $H_2$ is measured;

$$Z_3 = R_1 - \sqrt{R_1^2 - R_3^2}$$

is the height difference between the top of the dome and the height at radius $R_3$; and $$Z_2 = R_1 - \sqrt{R_1^2 - R_2^2}$$

is the height difference between the top of the dome and the height at radius $R_2$. Moreover, wall sections of a dome with an opening 208 can be calculated using thin plate theory, as set forth in FIG. 24. This gives approximate equations for the wall sections:

$$w(r) = w\left[1 - \left(\frac{r}{a}\right)^2\right]$$

-continued $$h(r) = \left[\frac{3}{2}(1-\upsilon)\frac{P_b}{E}\frac{a^2}{w(0)}\left(r^2 - b^2 - b^2\ln\left(\frac{r}{b}\right)\right)\right]^{1/3}$$

where the symbols are the same as for the solid dome with the addition of b, which is the radius of the opening.

A model used to evaluate such a cap 374 has periodic boundary conditions, to represent an infinite lattice 68 of cells 170 that have a hexagonal shape. The model covers four cells 170 having hexagonal shape wherein cell pitch (p) is 2 inches, the opening 208 has a diameter of 0.5 inches, and thickness (t) of the vertical walls 164 is 0.22 inches. 9 variants are simulated as set forth in the table below:

| R1 (in) | H2 (in) | H3 (in) |
|---|---|---|
| 2.1 | 0.206 | 0.25 |
| 2.1 | 0.217 | 0.30 |
| 2.1 | 0.228 | 0.35 |
| 3.0 | 0.192 | 0.30 |
| 3.0 | 0.202 | 0.35 |
| 3.0 | 0.213 | 0.40 |
| 3.8 | 0.202 | 0.40 |
| 3.8 | 0.213 | 0.45 |
| 3.8 | 0.224 | 0.50 |

In the simulation, the domes 374 are compressed with a planar indenter 107 until the average pressure on the plate is 0.65 psi (9.0 lbf over the 13.9 $in^2$ area of the model), which is a target buckling pressure. The distribution of the pressure over the plate can then be examined. It is found that design which gives the most uniform distribution has dimensions R1=3.8 inches, H2=0.20 inches, H3=0.40 inches. As with the solid dome, there is flexibility in how the dimensions are chosen.

Figure 25:
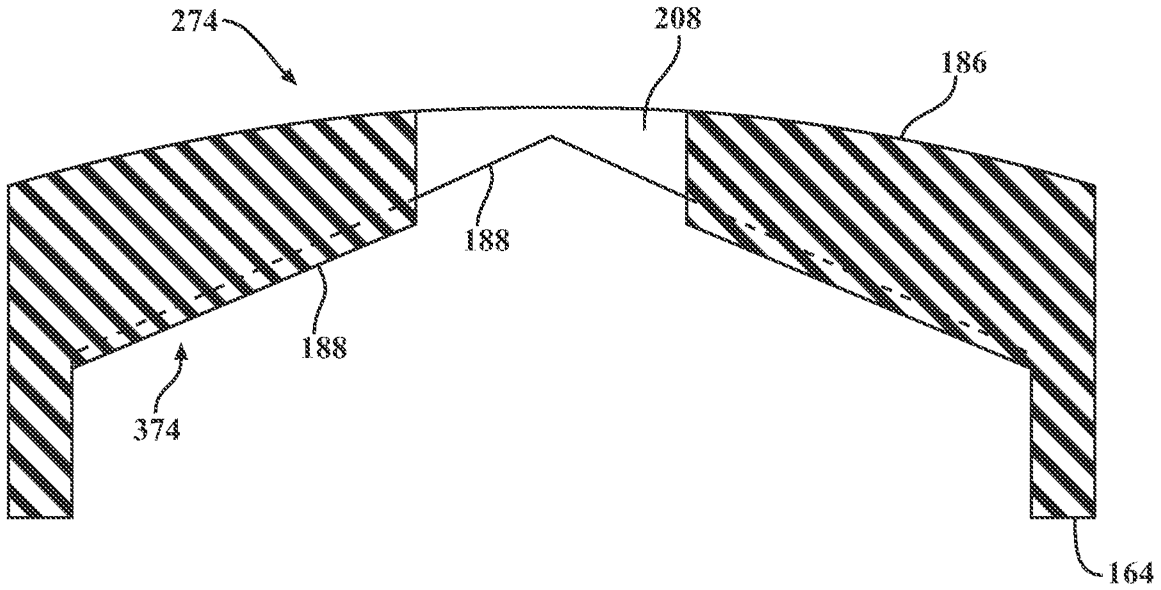
FIG. 25 illustrates a section of a solid dome overlaid on a section of a dome that defines an opening therein.

FIG. 25 sets forth a direct comparison overlay of physical structures of a solid dome 274 and a dome 374 that defines an opening 208, both of which have been designed to provide a good distribution of pressure. The dome with the opening 208 has a larger wall thickness near the opening 208 in order to provide comparable bending stiffness to the solid dome 274. In the version shown, the openings 208 are circular in shape, but may be hexagonal in shape and concentric with the hexagonal walls, or may be other suitable shapes.

Figure 26:
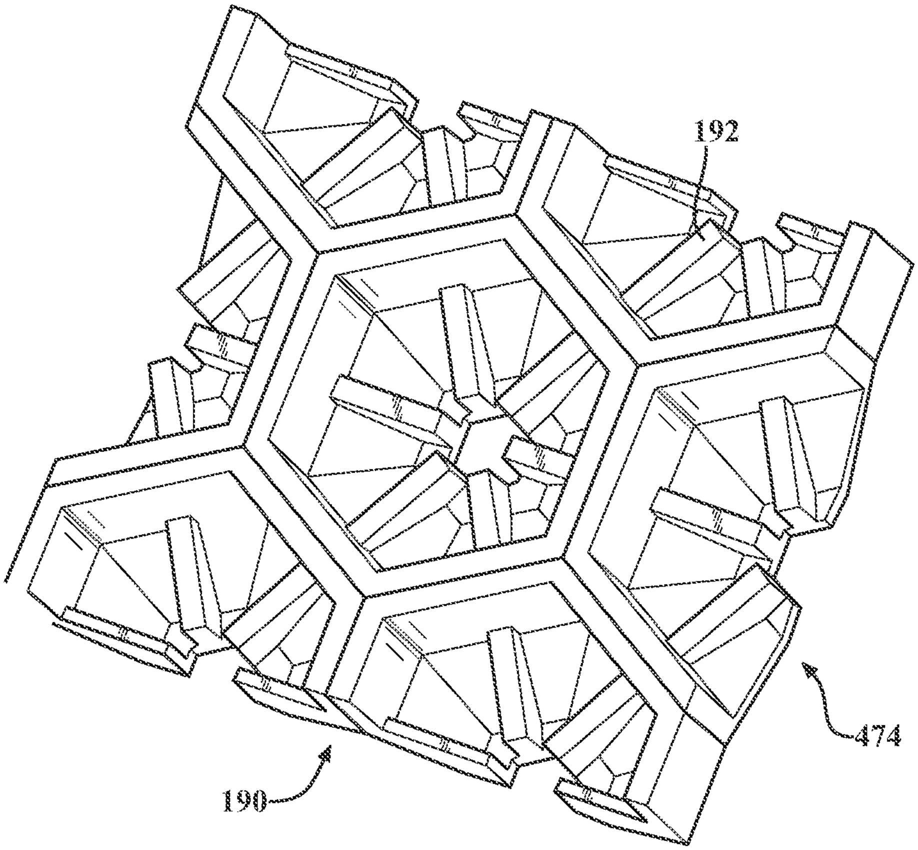
FIG. 26 is a perspective view of an underside of a cap that is described as a buttressed dome.

In another embodiment, the dome is the buttressed dome 474, i.e. a dome that comprises one or more buttresses 192. FIG. 26 sets forth a view of an underside 190 of the buttressed dome 474. Buttressed domes 474 allow the same pressure to be achieved with less material used to form the dome. However, when buttressed domes 474 are pressed flat, the TIP is not uniform but tends to be concentrated on the buttresses 192. Optimizing the design of a buttressed dome 474 involves a large number of parameters including, but not limited to: the thickness of the dome, which could have a radial profile; the depth and radial extent of the buttresses 192; and the taper of the buttress width from a top where it supports the dome to a bottom.

In one simulation, the simulation starts with a buttressed dome 474 and its thickness is varied as a function of angular position, θ, relative to the center of the dome. This function is periodic, e.g. h(r, θ)=H(r)[1+Acos(6θ)]. The modulation amplitude, A, can be varied and the both cap volume and TIP uniformity can be assessed. The buttresses 192 can also be spiraled so that they have a preferred direction for deflections in the horizontal plane. This avoids lateral buckling, which could complicate the response of the domes.

Figure 27A:
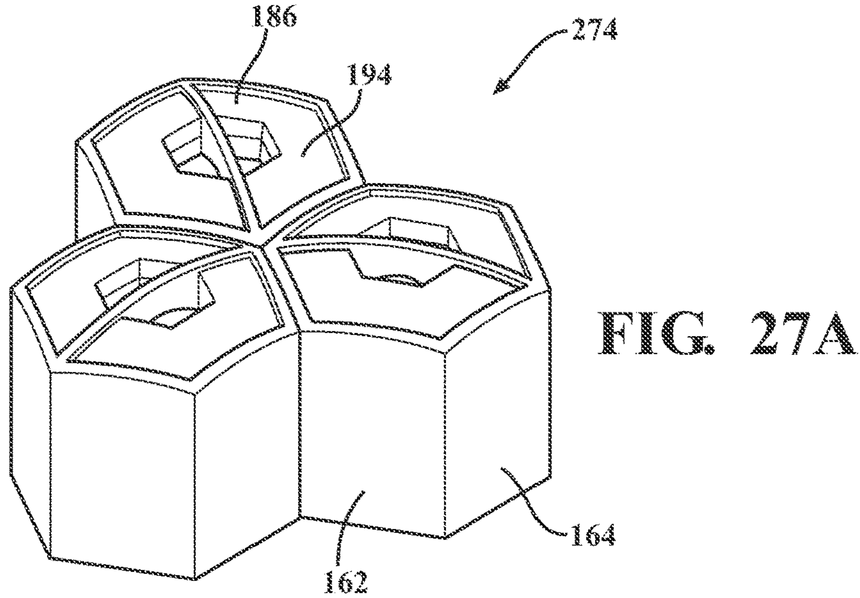
FIG. 27A is a side perspective view of a first embodiment of a cap that is described as having a pattern thereon or therein.
Figure 27B:
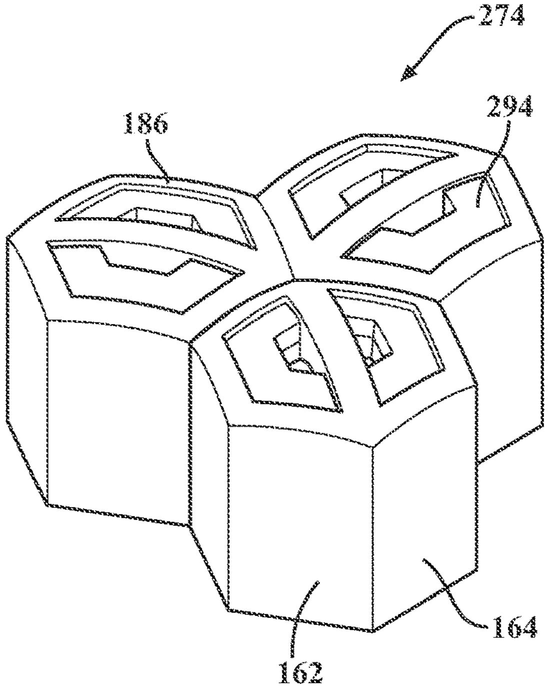
FIG. 27B is a side perspective view of a second embodiment of a cap that is described as having a pattern thereon or therein.
Figure 27C:
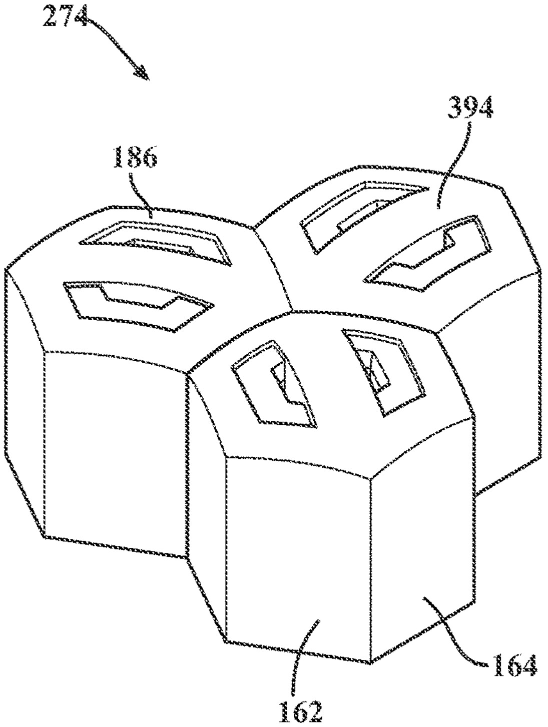
FIG. 27C is a side perspective view of a third embodiment of a cap that is described as having a pattern thereon or therein.

In still other embodiments, the domes 274 include a pattern 194, 294, 394 thereon or therein, e.g. as shown in FIGS. 27A, 27B, and 27C. In these Figures, the indented features in the domes are recessed 1 mm (0.040") below a top surface. Pressure distributions can be simulated using a planar indenter 107 with a ⅛ inch layer of stiff material disposed between the indenter 107 and the domes. This extra layer represents patient skin, so that pressure distributions take into account how the skin might conform to the patient support 32. The results show that indented features are preferably minimized.

It should be appreciated that in any of the embodiments described herein or in other embodiments, the domes may be integrated into one or more pressure distribution layers with each layer comprising multiple domes and with the one or more layers of domes being placed on the cells separately and attached to the cells, e.g., via adhesive, tape, welding, or the like. In other cases, the domes may be integrally formed with the buckling elements.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support for supporting a patient, the patient support comprising:

a lattice of cells, each of the cells having a base, a top disposed opposite the base, one or more buckling elements configured to compress under a patient load, the bucking elements extending from the base to the top to form a column that defines an empty interior volume defined by a perimeter of the one or more buckling elements, and a cap disposed on the one or more buckling elements to disperse compression pressure exerted on the top, wherein the cap extends at least partially beyond the top of the column;

wherein the cap defines a central opening and includes a dome having a curved top surface;

wherein the one or more buckling elements have a thickness;

wherein the column has a height measured from the base to the top, and a width, with a maximum value of the height being at least 2.5 times a maximum value of the width; and wherein the width is measured between centers of opposing buckling elements of the one or more buckling elements.

2. The patient support of claim 1, wherein each of the one or more buckling elements comprise one of a wall and a spring.

3. The patient support of claim 1, wherein the caps are integrally formed with the one or more buckling elements and extend beyond the top of the column to form a dome-shape.

4. The patient support of claim 1, wherein the one or more buckling elements comprise six buckling elements which are arranged in a hexagonal shape and the cap is disposed on the six buckling elements.

5. The patient support of claim 4, wherein the lattice of cells includes a head lattice section, a torso lattice section, and a foot lattice section, with the head lattice section, the torso lattice section, and the foot lattice section each being separately formed and connected in an abutting zig-zag pattern to provide a continuous, interlocking arrangement.

6. The patient support of claim 1, wherein the curved top surface of the dome is spherical.

7. The patient support of claim 6, wherein the dome includes a conical bottom surface.

8. The patient support of claim 1, further comprising a cover having opposing top and bottom layers; and wherein the lattice of cells is arranged within the cover so that a single layer of the cells is present between the top and bottom layers.

9. The patient support of claim 1, wherein the thickness and the width are in a ratio of from 0.06:1 to 0.12:1.

10. The patient support of claim 9, wherein each of the one or more buckling elements has a first thickness measured at the base and a second thickness measured at the top, with the second thickness being different from the first thickness.

11. The patient support of claim 10, wherein a ratio of the second thickness to the first thickness is from 1.1:1 to 1.27:1.

12. The patient support of claim 1, wherein the column is configured to exhibit a consistent patient plateau pressure ($P_b$) of ±0.1 psi to the patient over a compression displacement of the column of 0.75 to 2.5 inches.

13. The patient support of claim 1, wherein the lattice of cells is formed of a visco-elastic material.

14. A patient support for supporting a patient, the patient support comprising:

a lattice of cells, each of the cells having a base, a top disposed opposite the base, one or more buckling elements configured to compress under a patient load, the bucking elements extending from the base to the top to form a column that defines an empty interior volume defined by a perimeter of the one or more buckling elements, and a cap disposed on the one or more buckling elements to disperse compression pressure exerted on the top, wherein the cap extends at least partially beyond the top of the column;

wherein the cap defines a central opening and includes a dome having a curved top surface; and wherein the column is configured to exhibit a consistent patient plateau pressure ($P_b$) of +0.1 psi to the patient over a compression displacement of the column of 0.75 to 2.5 inches.

* * * * *